(12) United States Patent
Zhang et al.

(10) Patent No.: US 12,196,921 B2
(45) Date of Patent: Jan. 14, 2025

(54) OPTICAL IMAGING LENS ASSEMBLY

(71) Applicant: Zhejiang Sunny Optics Co., Ltd., Yuyao (CN)

(72) Inventors: Shuang Zhang, Yuyao (CN); Xiaobin Zhang, Yuyao (CN); Jianke Wenren, Yuyao (CN); Fujian Dai, Yuyao (CN); Liefeng Zhao, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 776 days.

(21) Appl. No.: 17/398,473

(22) Filed: Aug. 10, 2021

(65) Prior Publication Data

US 2022/0057607 A1 Feb. 24, 2022

(30) Foreign Application Priority Data

Aug. 19, 2020 (CN) .......................... 202010836872.7

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 13/18; G02B 9/64; G02B 13/00; G02B 13/005; G02B 9/62; G02B 9/34; G02B 3/02; G02B 13/24; G02B 27/0025; G02B 21/02; G02B 5/00; G02B 5/005; G02B 5/208
USPC ....... 359/755, 708, 700, 713, 751, 754, 642, 359/657, 682
See application file for complete search history.

(56) References Cited

U.S. PATENT DOCUMENTS

| 10,394,000 | B2* | 8/2019 | Lai ......................... G02B 13/06 |
| 2019/0146188 | A1* | 5/2019 | Lyu .................... G02B 13/0045 |
| | | | 359/708 |
| 2021/0302696 | A1* | 9/2021 | Nitta ........................ G02B 9/64 |

(Continued)

FOREIGN PATENT DOCUMENTS

| CN | 107577034 A | 1/2018 |
| CN | 109283657 A | 1/2019 |

(Continued)

OTHER PUBLICATIONS

Machine Translation of CN112394483A (Year: 2021).*

(Continued)

*Primary Examiner* — Jie Lei
(74) *Attorney, Agent, or Firm* — Sughrue Mion, PLLC

(57) ABSTRACT

The present disclosure discloses an optical imaging lens assembly, along an optical axis from an object side to an image side, sequentially includes: a first lens having positive refractive power; a second lens; a third lens; a fourth lens; a fifth lens, an image-side surface of the fifth lens being a concave surface; a sixth lens having positive refractive power; and a seventh lens having negative refractive power, an object-side surface of the seventh lens being a convex surface, and an image-side surface of the seventh lens being a concave surface; where, half of a diagonal length ImgH of an effective pixel area on an image plane, an entrance pupil diameter EPD of the optical lens assembly, and a total effective focal length f of the optical imaging lens assembly may satisfy:

ImgH*EPD/*f*>3.5 mm.

18 Claims, 9 Drawing Sheets

(56) References Cited

U.S. PATENT DOCUMENTS

| | | | |
|---|---|---|---|
| 2021/0382267 A1* | 12/2021 | Shin | G02B 13/0045 |
| 2022/0075143 A1* | 3/2022 | Tian | G02B 13/0045 |
| 2022/0075146 A1* | 3/2022 | Hu | G02B 13/0045 |
| 2022/0137339 A1* | 5/2022 | Kuo | G02B 9/64 |
| | | | 359/745 |
| 2022/0163770 A1* | 5/2022 | Jhang | G02B 13/0045 |
| 2022/0196980 A1* | 6/2022 | Lai | G02B 13/0045 |

FOREIGN PATENT DOCUMENTS

| | | | | |
|---|---|---|---|---|
| CN | 112394483 A | * | 2/2021 | |
| CN | 112987256 A | * | 6/2021 | G02B 13/0045 |
| JP | 2015-72403 A | | 4/2015 | |

OTHER PUBLICATIONS

Gross, Herbert. Handbook of Optical Systems vol. 3: Aberration Theory and Correction of Optical Systems. 2007. Wiley-VCH Verlag Gmbh & Co. pp. 378-379. (Year: 2007).*
Machine Translation of CN112987256A (Year: 2021).*

* cited by examiner

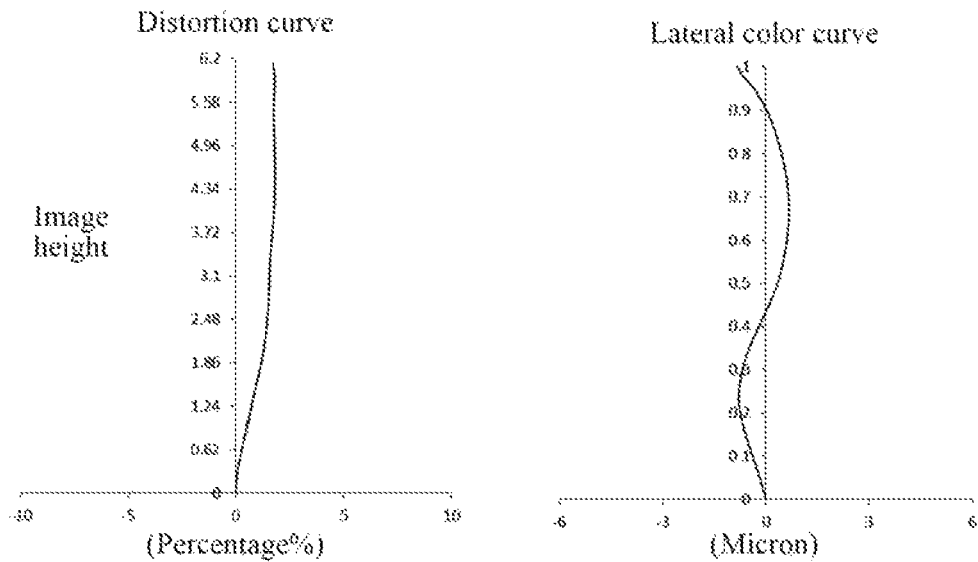
Fig. 10C
Fig. 10D
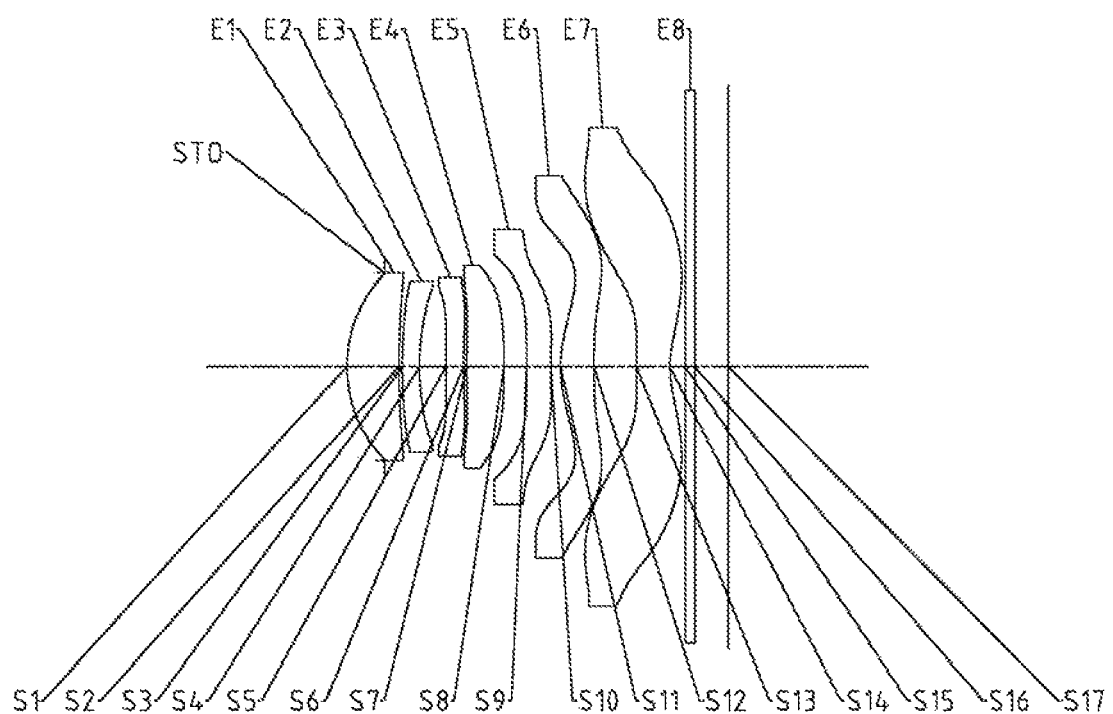
Fig. 11

OPTICAL IMAGING LENS ASSEMBLY

CROSS-REFERENCE TO RELATED APPLICATIONS

This application claims the priority from Chinese Patent Application No. 202010836872.7, filed in the National Intellectual Property Administration (CNIPA) on Aug. 19, 2020, the contents of which are hereby incorporated by reference in their entirety.

TECHNICAL FIELD

The present disclosure relates to the field of optical elements, and in particular relates to an optical imaging lens assembly.

BACKGROUND

A portable device such as mobile phone is usually equipped with a camera module to enable the mobile phone to have the shooting function. The camera module is usually provided with a charge-coupled device (CCD) type imaging sensor or a complementary metal oxide semiconductor (CMOS) type imaging sensor, and is provided with an optical imaging lens assembly. The optical imaging lens assembly may collect light on an object side. Imaging light travels along an optical path of the optical imaging lens assembly and arrives on the imaging sensor, and the imaging sensor converts optical signals into electrical signals to form image data.

People increasingly prefer to take pictures with mobile phones in daily life, and expect the mobile phones to have powerful shooting functions. The optical imaging lens assembly is constantly updated with market demands. It is generally expected that the optical imaging lens assembly has the characteristics of large aperture, large image plane, ultra-thin, wide-angle, telephoto, and small head. However, when an optical imaging lens assembly meets the requirements of one aspect, it will always affect the performance in other aspects. Therefore, one of the development directions of camera modules is to provide a plurality of optical imaging lens assemblies. However, it is still hoped that the performance of a single optical imaging lens assembly can be improved, even with high design difficulty.

In order to meet installation requirements, imaging requirements and other requirements of the portable devices, there is a need for an optical imaging lens assembly that can take into account at least two of miniaturization, super-large aperture, large image plane, low noise, and high imaging quality.

SUMMARY

The present disclosure provides an optical imaging lens assembly, from an object side to an image side along an optical axis, sequentially includes: a first lens having positive refractive power; a second lens; a third lens; a fourth lens; a fifth lens, an image-side surface of the fifth lens being a concave surface; a sixth lens having positive refractive power; and a seventh lens having negative refractive power, an object-side surface of the seventh lens being a convex surface, and an image-side surface of the seventh lens being a concave surface; where, half of a diagonal length ImgH of an effective pixel area on an image plane, an entrance pupil diameter EPD of the optical lens assembly, and a total effective focal length f of the optical imaging lens assembly may satisfy: $ImgH*EPD/f > 3.5$ mm.

In an embodiment, at least one of an object-side surface of the first lens to the image-side surface of the seventh lens is aspheric.

In an embodiment, the total effective focal length f of the optical imaging lens assembly and a maximal field-of-view FOV of the optical imaging lens assembly may satisfy: $5.5$ mm $< f*\tan(FOV/2) < 6.5$ mm.

In an embodiment, the total effective focal length f of the optical imaging lens assembly and the entrance pupil diameter EPD of the optical imaging lens assembly may satisfy: $f/EPD < 1.7$.

In an embodiment, a maximal field-of-view FOV of the optical imaging lens assembly may satisfy: $80° < FOV < 100°$.

In an embodiment, an effective focal length f2 of the second lens, an effective focal length f5 of the fifth lens, and an effective focal length f3 of the third lens may satisfy: $1.0 < (f2+f5)/f3 < 1.5$.

In an embodiment, an effective focal length f4 of the fourth lens, an effective focal length f1 of the first lens, and an effective focal length f6 of the sixth lens may satisfy: $1.2 < f4/(f1+f6) < 1.6$.

In an embodiment, a radius of curvature R14 of the image-side surface of the seventh lens, a radius of curvature R13 of the object-side surface of the seventh lens, and an effective focal length f7 of the seventh lens may satisfy: $1.7 < (R14-R13)/f7 < 2.2$.

In an embodiment, a radius of curvature R2 of an image-side surface of the first lens and a radius of curvature R1 of an object-side surface of the first lens may satisfy: $1.5 < (R2+R1)/(R2-R1) < 2.0$.

In an embodiment, an on-axis distance TTL from an object-side surface of the first lens to the image plane and half of a diagonal length ImgH of an effective pixel area on the image plane may satisfy: $TTL/ImgH < 1.4$.

In an embodiment, a combined focal length f12 of the first lens and the second lens, a center thickness CT1 of the first lens on the optical axis, and a center thickness CT2 of the second lens on the optical axis may satisfy: $5.5 < f12/(CT1+CT2) < 6.5$.

In an embodiment, a center thickness CT4 of the fourth lens on the optical axis and an edge thickness ET4 of the fourth lens may satisfy: $2.0 < CT4/ET4 < 2.5$.

In an embodiment, an on-axis distance SAG71 from an intersection of the object-side surface of the seventh lens and the optical axis to a vertex of an effective radius of the object-side surface of the seventh lens and an on-axis distance SAG61 from an intersection of an object-side surface of the sixth lens and the optical axis to a vertex of an effective radius of the object-side surface of the sixth lens may satisfy: $1.8 < SAG71/SAG61 < 2.3$.

In an embodiment, a center thickness CT6 of the sixth lens on the optical axis, a center thickness CT7 of the seventh lens on the optical axis, and a spacing distance T67 between the sixth lens and the seventh lens on the optical axis may satisfy: $1.4 < (CT6+CT7)/T67 < 1.8$.

Another aspect of the present disclosure provides an optical imaging lens assembly, from an object side to an image side along an optical axis, sequentially includes: a first lens having positive refractive power; a second lens; a third lens; a fourth lens; a fifth lens, an image-side surface of the fifth lens being a concave surface; a sixth lens having positive refractive power; and a seventh lens having negative refractive power, an object-side surface of the seventh lens being a convex surface, and an image-side surface of the seventh lens being a concave surface; where, a radius of curvature R14 of the image-side surface of the seventh lens, a radius of curvature R13 of the object-side surface of the seventh lens, and an effective focal length f7 of the seventh lens may satisfy: 1.7<(R14−R13)/f7<2.2.

In an embodiment, a total effective focal length f of the optical imaging lens assembly and a maximal field-of-view FOV of the optical imaging lens assembly may satisfy: 5.5 mm<f*tan(FOV/2)<6.5 mm.

In an embodiment, a total effective focal length f of the optical imaging lens assembly and an entrance pupil diameter EPD of the optical imaging lens assembly may satisfy: f/EPD<1.7.

In an embodiment, a maximal field-of-view FOV of the optical imaging lens assembly may satisfy: 80°<FOV<100°.

In an embodiment, an effective focal length f2 of the second lens, an effective focal length f5 of the fifth lens, and an effective focal length f3 of the third lens may satisfy: 1.0<(f2+f5)/f3<1.5.

In an embodiment, an effective focal length f4 of the fourth lens, an effective focal length f1 of the first lens, and an effective focal length f6 of the sixth lens may satisfy: 1.2<f4/(f1+f6)<1.6.

In an embodiment, half of a diagonal length ImgH of an effective pixel area on an image plane, an entrance pupil diameter EPD of the optical lens assembly, and a total effective focal length f of the optical imaging lens assembly may satisfy: ImgH*EPD/f>3.5 mm.

In an embodiment, a radius of curvature R2 of an image-side surface of the first lens and a radius of curvature R1 of an object-side surface of the first lens may satisfy: 1.5<(R2+R1)/(R2−R1)<2.0.

In an embodiment, an on-axis distance TTL from an object-side surface of the first lens to an image plane and half of a diagonal length ImgH of an effective pixel area on the image plane may satisfy: TTL/ImgH<1.4.

In an embodiment, a combined focal length f12 of the first lens and the second lens, a center thickness CT1 of the first lens on the optical axis, and a center thickness CT2 of the second lens on the optical axis may satisfy: 5.5<f12/(CT1+CT2)<6.5.

In an embodiment, a center thickness CT4 of the fourth lens on the optical axis and an edge thickness ET4 of the fourth lens may satisfy: 2.0<CT4/ET4<2.5.

In an embodiment, an on-axis distance SAG71 from an intersection of the object-side surface of the seventh lens and the optical axis to a vertex of an effective radius of the object-side surface of the seventh lens and an on-axis distance SAG61 from an intersection of an object-side surface of the sixth lens and the optical axis to a vertex of an effective radius of the object-side surface of the sixth lens may satisfy: 1.8<SAG71/SAG61<2.3.

In an embodiment, a center thickness CT6 of the sixth lens on the optical axis, a center thickness CT7 of the seventh lens on the optical axis, and a spacing distance T67 between the sixth lens and the seventh lens on the optical axis may satisfy: 1.4<(CT6+CT7)/T67<1.8.

The present disclosure adopts seven lenses, by rationally configuring the refractive powers, the surface shapes, the center thicknesses of lenses, and the on-axis spaced intervals between the lenses and the like, the above optical imaging lens assembly has at least one beneficial effect, such as miniaturization, super-large aperture, large image plane, low noise, and high imaging quality and the like. For example, the present disclosure may achieve miniaturization and large image plane. On the other hand, the present disclosure may also achieve large image plane and high imaging quality. Typically, when pursuing a large aperture, it may increase light flux of an optical imaging system, thereby improving the texture of the picture. However, increasing the light flux may also make more imaging noise, while the optical imaging lens assembly provided by the present disclosure also has the effect of low noise.

BRIEF DESCRIPTION OF THE DRAWINGS

Other features, objectives, and advantages of the present disclosure will become more apparent from the following detailed description of the non-limiting embodiments with reference to the accompanying drawings. In the accompanying drawings:

FIGS. 10A to 10D illustrate a longitudinal aberration curve, an astigmatic curve, a distortion curve and a lateral color curve of the optical imaging lens assembly according to Example 5, respectively; and FIG. 11 illustrates a schematic structural view of an optical imaging lens assembly according to Example 6 of the present disclosure.

DETAILED DESCRIPTION OF EMBODIMENTS

Figure 1:
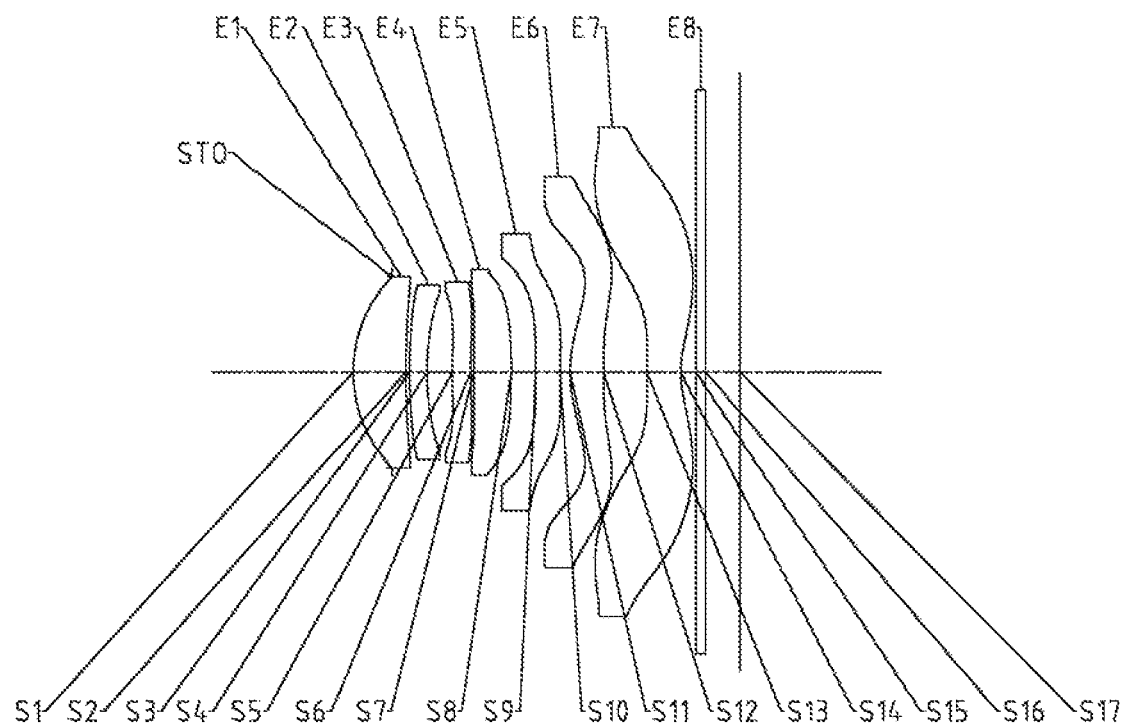
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial area; and if a surface of a lens is concave and the position of the concave is not defined, it indicates that the surface of the lens is concave at least in the paraxial area. In each lens, the surface closest to the object is referred to as an object-side surface of the lens, and the surface closest to the image plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, seven lenses having refractive power. The seven lenses are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between any two adjacent lenses.

In an exemplary embodiment, the first lens may have positive refractive power; the second lens has positive refractive power or negative refractive power; the third lens has positive refractive power or negative refractive power; the fourth lens has positive refractive power or negative refractive power; the fifth lens has positive refractive power or negative refractive power, and an image-side surface of the fifth lens is a concave surface; the sixth lens has positive refractive power or negative refractive power; and the seventh lens may have negative refractive power, an object-side surface of the seventh lens is a convex surface, and an image-side surface of the seventh lens is a concave surface. The first lens having positive refractive power has a converging effect on imaging light. A combination of the first lens with the second lens, the third lens and the fourth lens is beneficial to comprehensively correct imaging aberrations such as chromatic aberration, spherical aberration and astigmatism. The fifth lens with the image-side surface thereof being a concave surface is conducive to the divergence of an external field-of-view, so as to achieve the purpose of increasing the image plane. In addition, light transmitted through the fifth lens may be converged after continuing to pass through the sixth lens having positive refractive power, thereby avoiding the phenomenon that the light locally transmits too steeply; finally, the light passes through the seventh lens which has negative refractive power and a convex object-side surface and a concave image-side surface. The seventh lens is beneficial to further increase a range of the image plane of the optical imaging lens assembly.

In an exemplary embodiment, the optical imaging lens assembly of the present disclosure may satisfy the condition: ImgH*EPD/f>3.5 mm, where ImgH is half of a diagonal length of an effective pixel area on the image plane, EPD is an entrance pupil diameter of the optical lens assembly, and f is a total effective focal length of the optical imaging lens assembly. Satisfying ImgH*EPD/f>3.5 mm may ensure that the optical imaging lens assembly has an image plane large enough, and at the same time has a large optical aperture. A large aperture is very important for mobile phone photography. By increasing the aperture, light flux of the optical imaging lens assembly may be increased, thereby improving the texture of the picture. Particularly, ImgH, EPD, and f may satisfy: 3.75 mm<ImgH*EPD/f<4.00 mm.

In an exemplary embodiment, the optical imaging lens assembly of the present disclosure may satisfy the condition: 5.5 mm<f*tan(FOV/2)<6.5 mm, where f is the total effective focal length of the optical imaging lens assembly, and FOV is a maximal field-of-view of the optical imaging lens assembly. Satisfying 5.5 mm<f*tan(FOV/2)<6.5 mm is beneficial to control imaging parameters of the optical imaging lens assembly, and is also beneficial to control an aperture size of each lens, thereby reducing the size of the lens to a certain extent, and further reducing the sensitivity of the lens. Particularly, f and FOV may satisfy: 5.90 mm<f*tan(FOV/2)<6.25 mm.

In an exemplary embodiment, the optical imaging lens assembly of the present disclosure may satisfy the condition: f/EPD<1.7, where f is the total effective focal length of the optical imaging lens assembly, and EPD is the entrance pupil diameter of the optical imaging lens assembly. Satisfying f/EPD<1.7 is conducive to increasing the optical aperture of the optical imaging lens assembly, so as to achieve the effect of increasing the light flux, thereby improving the texture of the shot picture. Particularly, f and EPD may satisfy: f/EPD<1.63.

In an exemplary embodiment, the optical imaging lens assembly of the present disclosure may satisfy the condition: 80°<FOV<100°, where FOV is the maximal field-of-view of the optical imaging lens assembly. Satisfying 80°<FOV<100° may ensure that the optical imaging lens assembly has a field-of-view large enough, and increase a shooting space of the optical imaging lens assembly. Furthermore, the picture taken by the optical imaging lens assembly has a majestic texture. Particularly, FOV may satisfy: $84.4°<FOV<87.5°$.

In an exemplary embodiment, the optical imaging lens assembly of the present disclosure may satisfy the condition: $1.0<(f2+f5)/f3<1.5$, where f2 is an effective focal length of the second lens, f5 is an effective focal length of the fifth lens, and f3 is an effective focal length of the third lens. Satisfying $1.0<(f2+f5)/f3<1.5$, the aberrations may be balanced, and at the same time lens shapes of the second lens, the third lens and the fifth lens may be appropriately controlled, which is beneficial to processing and molding of the lenses. Particularly, f2, f3, and f5 may satisfy: $1.23<(f2+f5)/f3<1.40$.

In an exemplary embodiment, the optical imaging lens assembly of the present disclosure may satisfy the condition: $1.2<f4/(f1+f6)<1.6$, where f4 is an effective focal length of the fourth lens, f1 is an effective focal length of the first lens, and f6 is an effective focal length of the sixth lens. Satisfying $1.2<f4/(f1+f6)<1.6$, the refractive powers of the first lens, the fourth lens and the sixth lens may be allocated rationally, which is beneficial to reduce a curvature of field of the optical imaging lens assembly under macro conditions, thereby reducing the aberrations of the optical imaging lens assembly under macro conditions. Particularly, f4, f1, and f6 may satisfy: $1.30<f4/(f1+f6)<1.40$.

In an exemplary embodiment, the optical imaging lens assembly of the present disclosure may satisfy the condition: $1.7<(R14-R13)/f7<2.2$, where R14 is a radius of curvature of the image-side surface of the seventh lens, R13 is a radius of curvature of the object-side surface of the seventh lens, and f7 is an effective focal length of the seventh lens. Satisfying $1.7<(R14-R13)/f7<2.2$, a shape of the seventh lens may be controlled, which in turn facilitates processing and molding of the seventh lens, and reduces sensitivity of the seventh lens. At the same time, stray light at the end of the optical imaging lens assembly may be reduced by controlling the shape of the seventh lens, thereby reducing noise and improving the imaging quality. Particularly, R14, R13, and f7 may satisfy: $1.75<(R14-R13)/f7<2.15$.

In an exemplary embodiment, the optical imaging lens assembly of the present disclosure may satisfy the condition: $1.5<(R2+R1)/(R2-R1)<2.0$, where R2 is a radius of curvature of an image-side surface of the first lens and R1 is a radius of curvature of an object-side surface of the first lens. Satisfying $1.5<(R2+R1)/(R2-R1)<2.0$ may constrain a shape of the first lens while controlling the refractive power of the first lens, thereby reducing a ghost image generated by internal reflection of the first lens itself. Particularly, R2 and R1 may satisfy: $1.63<(R2+R1)/(R2-R1)<1.70$.

In an exemplary embodiment, the optical imaging lens assembly of the present disclosure may satisfy the condition: $TTL/ImgH<1.4$, where TTL is an on-axis distance from the object-side surface of the first lens to the image plane, and ImgH is half of the diagonal length of an effective pixel area on the image plane. Satisfying $TTL/ImgH<1.4$, the optical imaging lens assembly may have a larger image plane and a smaller size on this basis. The optical imaging lens assembly is suitable for portable devices. Particularly, TTL and ImgH may satisfy: $1.29<TTL/ImgH<1.36$.

In an exemplary embodiment, the optical imaging lens assembly of the present disclosure may satisfy the condition: $5.5<f12/(CT1+CT2)<6.5$, where f12 is a combined focal length of the first lens and the second lens, CT1 is a center thickness of the first lens on the optical axis, and CT2 is a center thickness of the second lens on the optical axis. Satisfying $5.5<f12/(CT1+CT2)<6.5$, lens shapes of the first lens and the second lens may be constrained, and the refractive powers of the first lens and the second lens may be allocated rationally. Furthermore, the spherical aberration and the chromatic aberration of the optical imaging lens assembly may be reduced by constraining the refractive powers of the first two lenses, so that the optical imaging lens assembly has good imaging performance. Particularly, f12, CT1, and CT2 may satisfy: $5.90<f12/(CT1+CT2)<6.00$.

In an exemplary embodiment, the optical imaging lens assembly of the present disclosure may satisfy the condition: $2.0<CT4/ET4<2.5$, where CT4 is a center thickness of the fourth lens on the optical axis, and ET4 is an edge thickness of the fourth lens. By controlling a ratio of the center thickness to the edge thickness of the fourth lens in this range, it is beneficial to optimize a shape of the fourth lens, and is beneficial to actual processing and molding, and may also control the refractive power of the fourth lens. The fourth lens and the third lens form a similar double-bonded structure, which is beneficial to balance and optimize the spherical aberration, the chromatic aberration and the like of the optical imaging lens assembly, so that the optical imaging lens assembly has good imaging performance. Particularly, CT4 and ET4 may satisfy: $2.25<CT4/ET4<2.38$.

In an exemplary embodiment, the optical imaging lens assembly of the present disclosure may satisfy the condition: $1.8<SAG71/SAG61<2.3$, where SAG71 is an on-axis distance from an intersection of the object-side surface of the seventh lens and the optical axis to a vertex of an effective radius of the object-side surface of the seventh lens, and SAG61 is an on-axis distance from an intersection of an object-side surface of the sixth lens and the optical axis to a vertex of an effective radius of the object-side surface of the sixth lens. By controlling a ratio of a sagittal height of the object-side surface of the seventh lens to a sagittal height of the sixth lens in this range, it is beneficial to control lens shapes of the seventh lens and the sixth lens, and at the same time, it is beneficial to optimize the curvature of field of the optical imaging lens assembly. The sensitivity of the optical imaging lens assembly to a spacing distance between the sixth lens and the seventh lens may also be controlled. Particularly, SAG71 and SAG61 may satisfy: $1.90<SAG71/SAG61<2.13$.

In an exemplary embodiment, the optical imaging lens assembly of the present disclosure may satisfy the condition: $1.4<(CT6+CT7)/T67<1.8$, where CT6 is a center thickness of the sixth lens on the optical axis, CT7 is a center thickness of the seventh lens on the optical axis, and T67 is a spacing distance between the sixth lens and the seventh lens on the optical axis. Satisfying $1.4<(CT6+CT7)/T67<1.8$ may control the shapes of the sixth lens and the seventh lens, improve the refractive powers of the two lenses, and at the same time help to optimize the sensitivity of the optical imaging lens assembly to the spacing distance between the last two lenses. Particularly, CT6, CT7, and T67 may satisfy: $1.54<(CT6+CT7)/T67<1.64$.

In an exemplary embodiment, the optical imaging lens assembly may further include at least one diaphragm. The diaphragm may be arranged at an appropriate position as required, for example, between the object side and the first lens. Alternatively, the optical imaging lens assembly may further include an optical filter for correcting color deviation and/or a protective glass for protecting a photosensitive element on the image plane.

The optical imaging lens assembly according to the above embodiments of the present disclosure may employ a plurality of lenses, such as seven lenses as described above. By rationally configuring the refractive power of each lens, the surface shape, the center thickness of each lens, and spaced intervals along the optical axis between the lenses, the volume and the sensitivity of the optical imaging lens assembly may be effectively reduced, and the workability of the optical imaging lens assembly may be improved, such that the optical imaging lens assembly is more advantageous for production processing and may be applied to portable electronic products. At the same time, the optical imaging lens assembly of the present disclosure also has excellent optical performance, such as super-large aperture, large image plane, low noise, or high imaging quality.

In embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the imaging quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiments will be further described below with reference to the accompanying drawings.

Example 1

An optical imaging lens assembly according to Example 1 of the present disclosure is described below with reference to FIG. 1 to FIG. 2D. FIG. 1 illustrates a schematic structural view of the optical imaging lens assembly according to Example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an image plane S17, and light from an object sequentially passes through the respective surfaces S1 to S16 and is finally imaged on the image plane S17.

Table 1 is a table illustrating basic parameters of the optical imaging lens assembly of Example 1, where the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | 2000.0000 | | | | |
| STO | Spherical | Infinite | −0.8233 | | | | |
| S1 | Aspheric | 2.9229 | 1.1148 | 1.55 | 56.1 | 6.80 | 0.0165 |
| S2 | Aspheric | 11.8763 | 0.0769 | | | | −46.4260 |
| S3 | Aspheric | 8.4821 | 0.3700 | 1.68 | 1.92 | −22.18 | 0.4137 |
| S4 | Aspheric | 5.3267 | 0.5451 | | | | −0.6017 |
| S5 | Aspheric | 19.9203 | 0.3840 | 1.68 | 1.92 | −27.40 | 11.4107 |
| S6 | Aspheric | 9.5348 | 0.0674 | | | | −99.0000 |
| S7 | Aspheric | 19.6113 | 0.7965 | 1.55 | 56.1 | 16.47 | −80.0000 |
| S8 | Aspheric | −16.3634 | 0.5197 | | | | 8.3488 |
| S9 | Aspheric | −67.8495 | 0.5185 | 1.57 | 37.3 | −14.76 | 51.4367 |
| S10 | Aspheric | 9.6420 | 0.2098 | | | | −3.7198 |
| S11 | Aspheric | 2.7947 | 0.7130 | 1.54 | 55.7 | 5.76 | −4.6171 |
| S12 | Aspheric | 26.2039 | 0.9200 | | | | 27.0141 |
| S13 | Aspheric | 12.4657 | 0.7200 | 1.54 | 55.7 | −5.27 | −30.2241 |
| S14 | Aspheric | 2.2598 | 0.3224 | | | | −1.1867 |
| S15 | Spherical | Infinite | 0.2100 | 1.52 | 64.2 | | |

TABLE 1-continued

| Surface number | Surface type | Radius of curvature | Thickness/ Distance | Refractive index | Abbe number | Focal length | Conic coefficient |
|---|---|---|---|---|---|---|---|
| | | | | Material | | | |
| S16 | Spherical | Infinite | 0.7270 | | | | |
| S17 | Spherical | Infinite | | | | | |

In Example 1, a total effective focal length f of the optical imaging lens assembly is 6.52 mm, an on-axis distance TTL from the object-side surface S1 of the first lens E1 to the image plane S17 is 8.22 mm, and half of a diagonal length ImgH of an effective pixel area on the image plane S17 is 6.33 mm.

In Example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in Example 1.

TABLE 2

| Surface number | A4 | A6 | A8 | A10 | A12 | A14 | A16 | A18 | A20 |
|---|---|---|---|---|---|---|---|---|---|
| S1 | −1.5019E−03 | 7.8270E−03 | −2.1802E−02 | 4.0523E−02 | −5.0524E−02 | 4.3389E−02 | −2.6233E−02 | 1.1326E−02 | −3.5107E−03 |
| S2 | −2.3844E−02 | 2.1107E−02 | −3.6610E−02 | 1.3159E−01 | −2.9599E−01 | 4.1233E−01 | −3.8215E−01 | 2.4521E−01 | −1.1076E−01 |
| S3 | −3.8200E−02 | 5.6279E−02 | −1.7701E−01 | 5.3713E−01 | −1.0742E+00 | 1.4378E+00 | −1.3345E+00 | 8.7738E−01 | −4.1161E−01 |
| S4 | −1.2343E−02 | −3.0375E−03 | 7.3455E−02 | −2.5305E−01 | 5.6054E−01 | −8.6485E−01 | 9.4904E−01 | −7.4758E−01 | 4.2284E−01 |
| S5 | −3.3640E−02 | 7.5523E−02 | −3.3102E−01 | 9.4263E−01 | −1.8110E+00 | 2.4326E+00 | −2.3407E+00 | 1.6333E+00 | −8.2757E−01 |
| S6 | −1.5693E−02 | 3.1009E−02 | −1.1838E−01 | 2.4426E−01 | −3.2448E−01 | 2.9331E−01 | −1.8526E−01 | 8.2710E−02 | −2.6021E−02 |
| S7 | −1.2854E−02 | 1.7015E−02 | −6.3389E−02 | 1.1930E−01 | −1.4070E−01 | 1.1006E−01 | −5.8233E−02 | 2.0933E−02 | −5.0417E−03 |
| S8 | −6.1788E−03 | −1.8043E−02 | 5.4242E−02 | −1.0875E−01 | 1.4423E−01 | −1.3355E−01 | 8.8619E−02 | −4.2611E−02 | 1.4849E−02 |
| S9 | −2.0006E−02 | −7.9272E−03 | 2.8026E−02 | −3.4577E−02 | 2.2951E−02 | −7.6287E−03 | −3.6412E−04 | 1.6255E−03 | −8.1074E−04 |
| S10 | −7.7728E−02 | 2.1201E−02 | −2.7411E−04 | −4.5982E−03 | 3.1020E−03 | −1.0905E−03 | 1.8370E−04 | 9.6594E−06 | −1.2040E−05 |
| S11 | −1.4805E−02 | 6.0157E−03 | −3.6849E−03 | 3.8010E−04 | 6.7695E−04 | −4.7669E−04 | 1.6702E−04 | −3.6776E−05 | 5.4134E−06 |
| S12 | 2.6434E−02 | −2.9294E−05 | −8.0350E−03 | 4.6689E−03 | −1.5539E−03 | 3.5021E−04 | −5.6020E−05 | 6.4704E−06 | −5.4123E−07 |
| S13 | −8.6229E−02 | 3.0177E−02 | −9.1549E−03 | 2.1852E−03 | −3.6346E−04 | 4.1436E−05 | −3.2530E−06 | 1.7404E−07 | −6.0238E−09 |
| S14 | −9.6730E−02 | 3.7076E−02 | −1.2035E−02 | 2.9951E−03 | −5.5428E−04 | 7.5750E−05 | −7.6396E−06 | 5.6768E−07 | −3.0878E−08 |

Figure 2A:
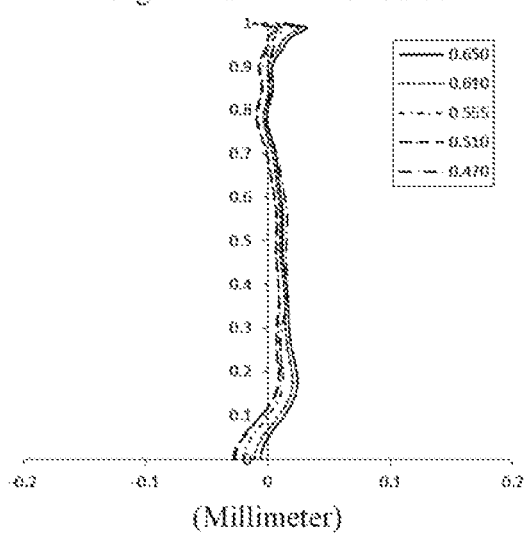
FIGS. 2A to 2D illustrate a longitudinal aberration curve, an astigmatic curve, a distortion curve and a lateral color curve of the optical imaging lens assembly according to Example 1, respectively.
Figure 2B:
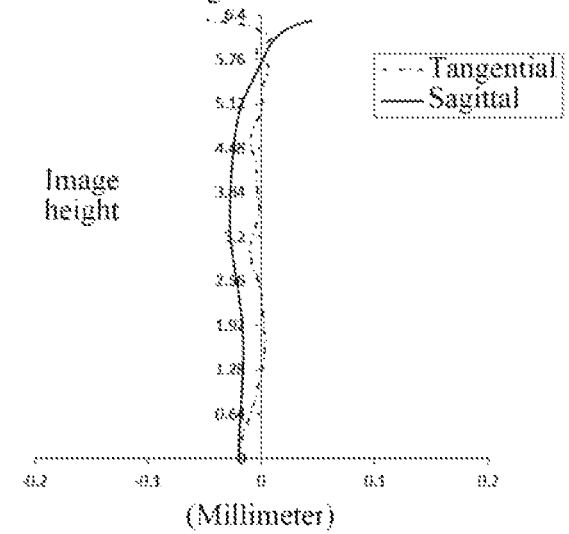
Figures 2C, 2D:
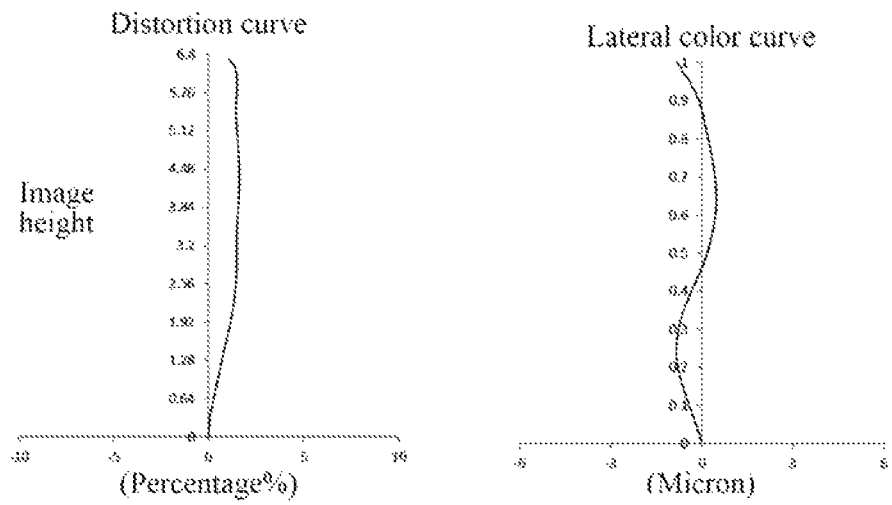

FIG. 2A illustrates the longitudinal aberration curve of the optical imaging lens assembly according to Example 1, representing deviations of focal points converged by light of different wavelengths after passing through the lens assembly. FIG. 2B illustrates the astigmatic curve of the optical imaging lens assembly according to Example 1, representing a curvature of a tangential plane and a curvature of a sagittal plane. FIG. 2C illustrates the distortion curve of the optical imaging lens assembly according to Example 1, representing the amounts of distortion corresponding to different image heights. FIG. 2D illustrates the lateral color curve of the optical imaging lens assembly according to Example 1, representing deviations of different image heights on an imaging plane after light passes through the lens assembly. It can be seen from FIG. 2A to FIG. 2D that the optical imaging lens assembly provided in Example 1 can achieve good image quality.

Example 2

Figure 3:
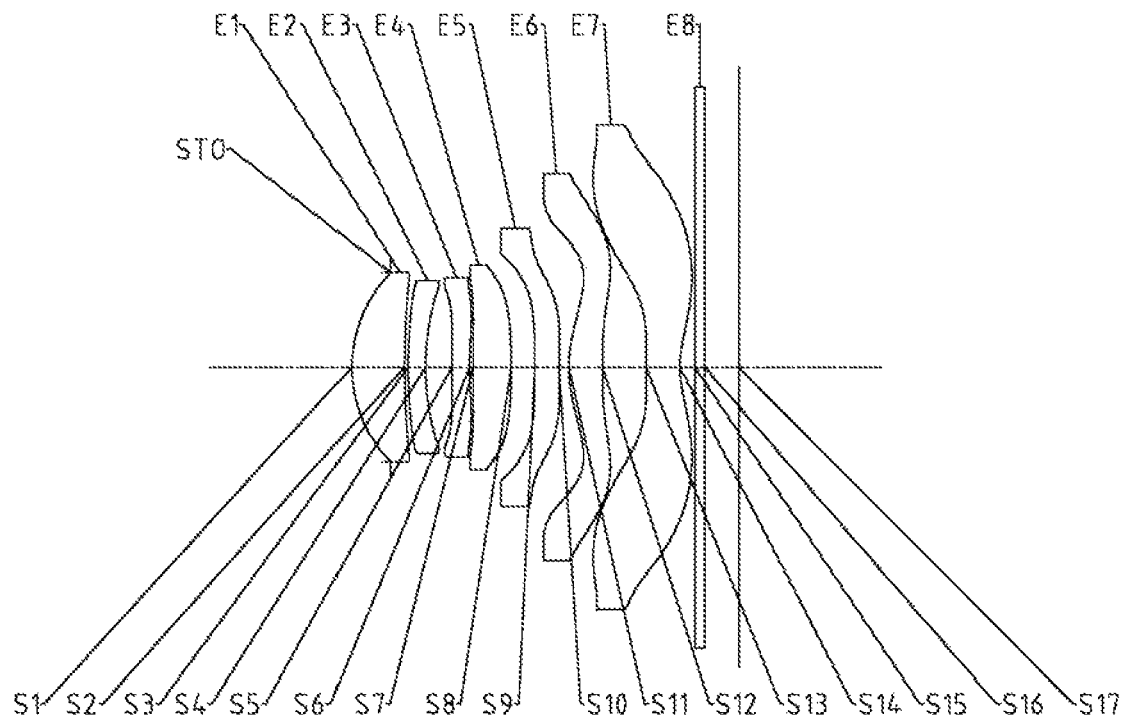
FIG. 3 illustrates a schematic structural view of an optical imaging lens assembly according to Example 2 of the present disclosure.

An optical imaging lens assembly according to Example 2 of the present disclosure is described below with reference to FIG. 3 to FIG. 4D. In this example and the following examples, for the purpose of brevity, the description of parts similar to those in Example 1 will be omitted. FIG. 3 illustrates a schematic structural view of the optical imaging lens assembly according to Example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an image plane S17, and light from an object sequentially passes through the respective surfaces S1 to S16 and is finally imaged on the image plane S17.

In Example 2, a total effective focal length f of the optical imaging lens assembly is 6.52 mm, an on-axis distance TTL along the optical axis from the object-side surface S1 of the first lens E1 to the image plane S17 is 8.22 mm, and half of a diagonal length ImgH of an effective pixel area on the image plane S17 is 6.28 mm.

Table 3 is a table illustrating basic parameters of the optical imaging lens assembly of Example 2, where the units for the radius of curvature, the thickness/distance and the focal length are millimeter (mm). Table 4 shows high-order coefficients applicable to each aspheric surface in Example 2, where the surface shape of each aspheric surface may be defined by the formula (1) given in the above Example 1.

Figure 4A:
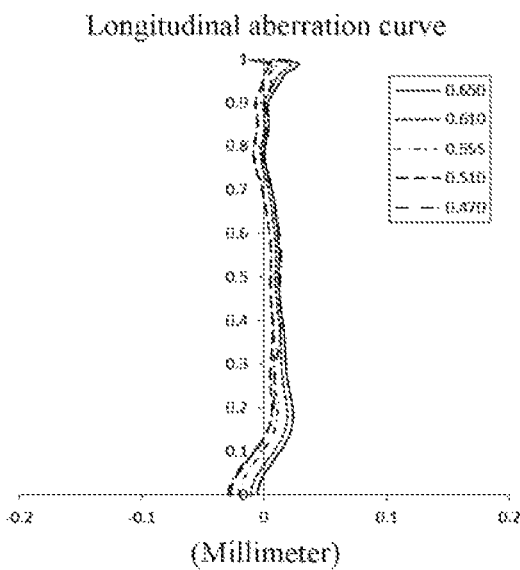
FIGS. 4A to 4D illustrate a longitudinal aberration curve, an astigmatic curve, a distortion curve and a lateral color curve of the optical imaging lens assembly according to Example 2, respectively.
Figure 4B:
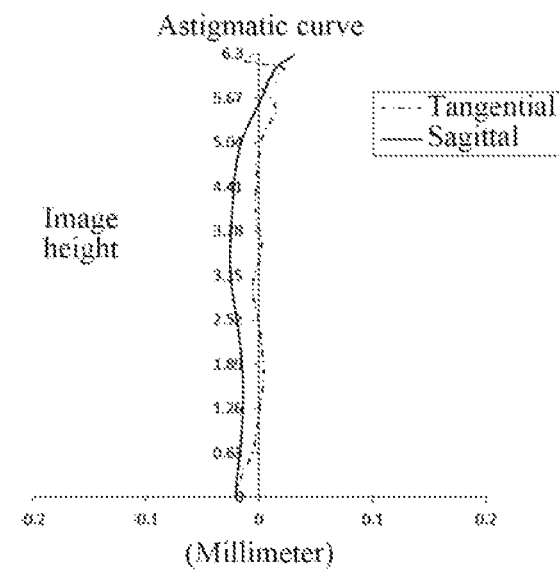
Figure 4C:
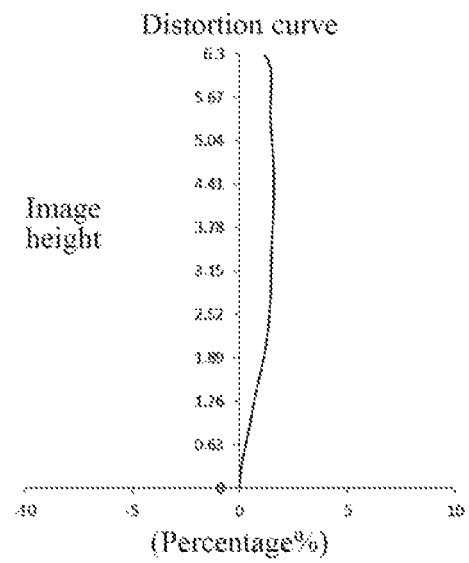
Figure 4D:
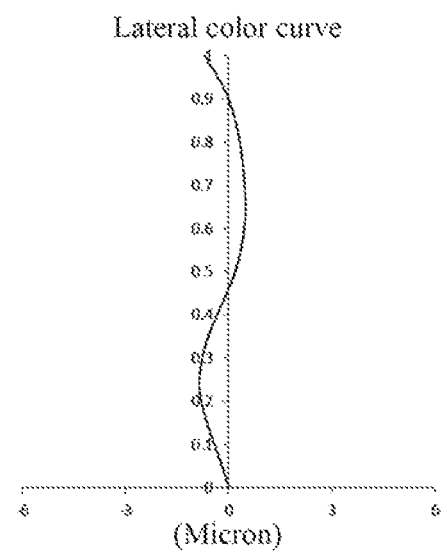

FIG. 4A illustrates the longitudinal aberration curve of the optical imaging lens assembly according to Example 2, representing deviations of focal points converged by light of different wavelengths after passing through the lens assembly. FIG. 4B illustrates the astigmatic curve of the optical imaging lens assembly according to Example 2, representing a curvature of a tangential plane and a curvature of a sagittal plane. FIG. 4C illustrates the distortion curve of the optical imaging lens assembly according to Example 2, representing the amounts of distortion corresponding to different image heights. FIG. 4D illustrates the lateral color curve of the optical imaging lens assembly according to Example 2, representing deviations of different image heights on an imaging plane after light passes through the lens assembly. It can be seen from FIG. 4A to FIG. 4D that the optical imaging lens assembly provided in Example 2 can achieve good image quality.

Example 3

Figure 5:
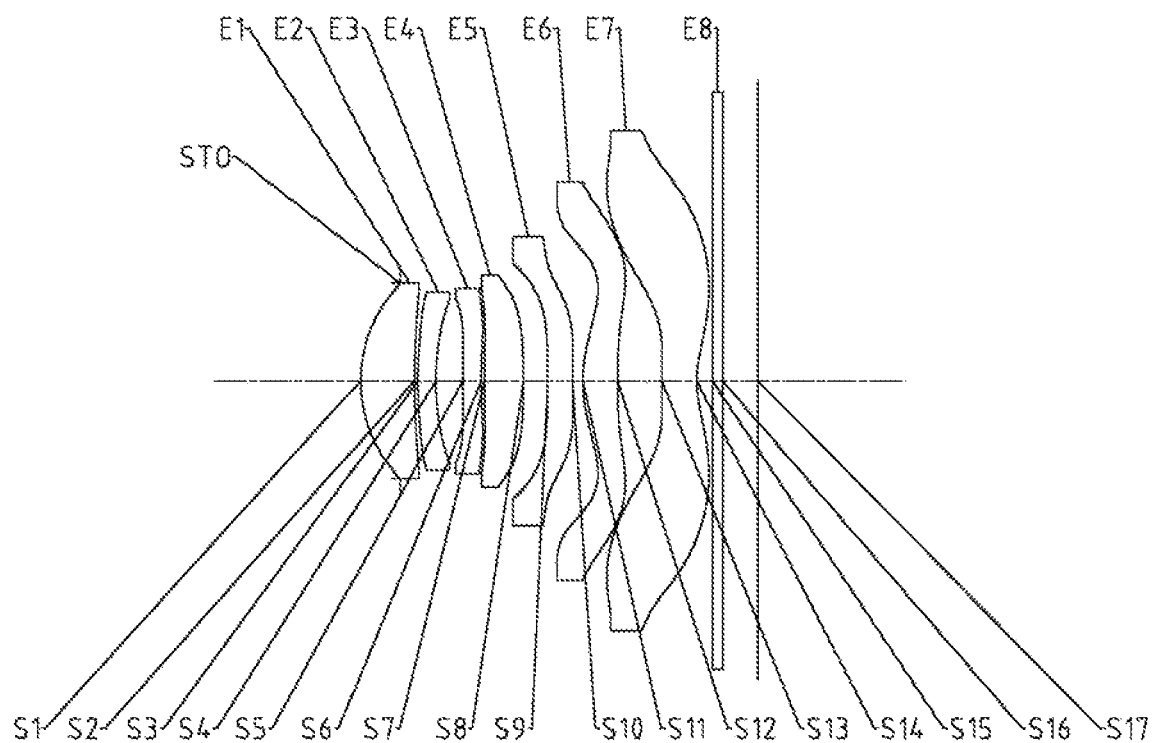
FIG. 5 illustrates a schematic structural view of an optical imaging lens assembly according to Example 3 of the present disclosure.

An optical imaging lens assembly according to Example 3 of the present disclosure is described below with reference to FIG. 5 to FIG. 6D. FIG. 5 illustrates a schematic structural

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 2000.0000 | | | | |
| STO | Spherical | Infinite | −0.8227 | | | | |
| S1 | Aspheric | 2.9235 | 1.1172 | 1.55 | 56.1 | 6.82 | 0.0183 |
| S2 | Aspheric | 11.7543 | 0.0743 | | | | −47.3717 |
| S3 | Aspheric | 8.2225 | 0.3700 | 1.68 | 1.92 | −22.90 | −0.1958 |
| S4 | Aspheric | 5.2765 | 0.5550 | | | | −0.5953 |
| S5 | Aspheric | 20.2614 | 0.3820 | 1.68 | 1.92 | −27.75 | 4.2701 |
| S6 | Aspheric | 9.6778 | 0.0693 | | | | −99.0000 |
| S7 | Aspheric | 22.1826 | 0.8117 | 1.55 | 56.1 | 16.53 | −78.7671 |
| S8 | Aspheric | −15.0239 | 0.5004 | | | | 9.5397 |
| S9 | Aspheric | −60.0032 | 0.5142 | 1.57 | 37.3 | −14.57 | −13.1808 |
| S10 | Aspheric | 9.6776 | 0.2073 | | | | −1.7521 |
| S11 | Aspheric | 2.8057 | 0.7147 | 1.54 | 55.7 | 5.75 | −4.6697 |
| S12 | Aspheric | 27.8820 | 0.9242 | | | | 27.2053 |
| S13 | Aspheric | 13.4087 | 0.7200 | 1.54 | 55.7 | −5.23 | −30.9495 |
| S14 | Aspheric | 2.2781 | 0.3202 | | | | −1.1812 |
| S15 | Spherical | Infinite | 0.2100 | 1.52 | 64.2 | | |
| S16 | Spherical | Infinite | 0.7249 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −1.3475E−03 | 6.7720E−03 | −1.7787E−02 | 3.1476E−02 | −3.7427E−02 | 3.0584E−02 | −1.7510E−02 | 7.1151E−03 | −2.0642E−03 |
| S2 | −2.4835E−02 | 2.5992E−02 | −5.2195E−02 | 1.6616E−01 | −3.4902E−01 | 4.6940E−01 | −4.2603E−01 | 2.6957E−01 | −1.2054E−01 |
| S3 | −3.7960E−02 | 5.2914E−02 | −1.5751E−01 | 4.7607E−01 | −9.5552E−01 | 1.2832E+00 | −1.1944E+00 | 7.8724E−01 | −3.7015E−01 |
| S4 | −1.1558E−02 | −6.8959E−03 | 9.0887E−02 | −3.0716E−01 | 6.7203E−01 | −1.0231E+00 | 1.1082E+00 | −8.6257E−01 | 4.8275E−01 |
| S5 | −3.2897E−02 | 7.2595E−02 | −3.2654E−01 | 9.4374E−01 | −1.8311E+00 | 2.4761E+00 | −2.3931E+00 | 1.6744E+00 | −8.4949E−01 |
| S6 | −1.7466E−02 | 3.8140E−02 | −1.4012E−01 | 2.8520E−01 | −3.7525E−01 | 3.3650E−01 | −2.1097E−01 | 9.3485E−02 | −2.9185E−02 |
| S7 | −1.5053E−02 | 2.5909E−02 | −8.5989E−02 | 1.5535E−01 | −1.7847E−01 | 1.3708E−01 | −7.1576E−02 | 2.5442E−02 | −6.0595E−03 |
| S8 | −5.6300E−03 | −2.3105E−02 | 7.2312E−02 | −1.4664E−01 | 1.9560E−01 | −1.8101E−01 | 1.1945E−01 | −5.6922E−02 | 1.9614E−02 |
| S9 | −2.0939E−02 | −4.4417E−03 | 2.1806E−02 | −2.7493E−02 | 1.7494E−02 | −4.9051E−03 | −1.1189E−03 | 1.6438E−03 | −7.3793E−04 |
| S10 | −7.8870E−02 | 2.3431E−02 | −1.7948E−03 | −4.7242E−03 | 4.1208E−03 | −1.9784E−03 | 6.1589E−04 | −1.2673E−04 | 1.7107E−05 |
| S11 | −1.5469E−02 | 5.9181E−03 | −3.1129E−03 | −7.8463E−05 | 8.7307E−04 | −5.2699E−04 | 1.7437E−04 | −3.7146E−05 | 5.3452E−06 |
| S12 | 2.6487E−02 | −1.3428E−03 | −6.7281E−03 | 4.0050E−03 | −1.3372E−03 | 3.0141E−04 | −4.8238E−05 | 5.5816E−06 | −4.6857E−07 |
| S13 | −8.6454E−02 | 3.0276E−02 | −9.3423E−03 | 2.3028E−03 | −3.9934E−04 | 4.7963E−05 | −4.0324E−06 | 2.3823E−07 | −9.7547E−09 |
| S14 | −9.5796E−02 | 3.6073E−02 | −1.1456E−02 | 2.7891E−03 | −5.0650E−04 | 6.8261E−05 | −6.8259E−06 | 5.0541E−07 | −2.7505E−08 | view of the optical imaging lens assembly according to Example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an image plane S17, and light from an object sequentially passes through the respective surfaces S1 to S16 and is finally imaged on the image plane S17.

In Example 3, a total effective focal length f of the optical imaging lens assembly is 6.51 mm, an on-axis distance TTL along the optical axis from the object-side surface S1 of the first lens E1 to the image plane S17 is 8.21 mm, and half of a diagonal length ImgH of an effective pixel area on the image plane S17 is 6.20 mm.

Table 5 is a table illustrating basic parameters of the optical imaging lens assembly of Example 3, where the units for the radius of curvature, the thickness/distance and the focal length are millimeter (mm). Table 6 shows high-order coefficients applicable to each aspheric surface in Example 3, where the surface shape of each aspheric surface may be defined by the formula (1) given in the above Example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 2000.0000 | | | | |
| STO | Spherical | Infinite | −0.8226 | | | | |
| S1 | Aspheric | 2.9211 | 1.1122 | 1.55 | 56.1 | 6.83 | 0.0201 |
| S2 | Aspheric | 11.6445 | 0.0698 | | | | −46.1937 |
| S3 | Aspheric | 7.9474 | 0.3700 | 1.68 | 1.92 | −22.82 | 0.1228 |
| S4 | Aspheric | 5.1504 | 0.5571 | | | | −0.4856 |
| S5 | Aspheric | 20.5009 | 0.3820 | 1.68 | 1.92 | −27.83 | 4.5697 |
| S6 | Aspheric | 9.7481 | 0.0683 | | | | −98.9313 |
| S7 | Aspheric | 21.5439 | 0.8042 | 1.55 | 56.1 | 16.73 | −80.0000 |
| S8 | Aspheric | −15.6450 | 0.5006 | | | | 11.0302 |
| S9 | Aspheric | −65.2880 | 0.5137 | 1.57 | 37.3 | −14.64 | −80.0000 |
| S10 | Aspheric | 9.6040 | 0.2127 | | | | −0.7927 |
| S11 | Aspheric | 2.8094 | 0.7220 | 1.54 | 55.7 | 5.70 | −4.6693 |
| S12 | Aspheric | 30.6795 | 0.9157 | | | | 28.4258 |
| S13 | Aspheric | 13.4159 | 0.7200 | 1.54 | 55.7 | −5.25 | −34.7873 |
| S14 | Aspheric | 2.2864 | 0.3250 | | | | −1.1789 |
| S15 | Spherical | Infinite | 0.2100 | 1.52 | 64.2 | | |
| S16 | Spherical | Infinite | 0.7296 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −1.3524E−03 | 6.5170E−03 | −1.6193E−02 | 2.7339E−02 | −3.1197E−02 | 2.4547E−02 | −1.3559E−02 | 5.3286E−03 | −1.5037E−03 |
| S2 | −2.6794E−02 | 2.7190E−02 | −4.6333E−02 | 1.4753E−01 | −3.1886E−01 | 4.3787E−01 | −4.0367E−01 | 2.5870E−01 | −1.1698E−01 |
| S3 | −4.0261E−02 | 5.5820E−02 | −1.5794E−01 | 4.6897E−01 | −9.3633E−01 | 1.2545E+00 | −1.1663E+00 | 7.6847E−01 | −3.6142E−01 |
| S4 | −1.2293E−02 | −3.2602E−03 | 6.7911E−02 | −2.1743E−01 | 4.5142E−01 | −6.6356E−01 | 7.0492E−01 | −5.4457E−01 | 3.0501E−01 |
| S5 | −3.1164E−02 | 5.9623E−02 | −2.6501E−01 | 7.5593E−01 | −1.4467E+00 | 1.9298E+00 | −1.8418E+00 | 1.2743E+00 | −6.4046E−01 |
| S6 | −1.6282E−02 | 3.0474E−02 | −1.1457E−01 | 2.3166E−01 | −3.0127E−01 | 2.6687E−01 | −1.6529E−01 | 7.2347E−02 | −2.2304E−02 |
| S7 | −1.4442E−02 | 2.1794E−02 | −7.4445E−02 | 1.3460E−01 | −1.5394E−01 | 1.1785E−01 | −6.1417E−02 | 2.1801E−02 | −5.1827E−03 |
| S8 | −5.5662E−03 | −2.3512E−02 | 7.1500E−02 | −1.4373E−01 | 1.9152E−01 | −1.7764E−01 | 1.1768E−01 | −5.6326E−02 | 1.9497E−02 |
| S9 | −1.9450E−02 | −1.0116E−02 | 3.2119E−02 | −3.9492E−02 | 2.6899E−02 | −9.9583E−03 | 7.2795E−04 | 1.2058E−03 | −6.8126E−04 |
| S10 | −7.6707E−02 | 1.5506E−02 | 1.1106E−02 | −1.7160E−02 | 1.2039E−02 | −5.4843E−03 | 1.7220E−03 | −3.7769E−04 | 5.8022E−05 |
| S11 | −1.5113E−02 | 2.4022E−03 | 1.2629E−03 | −2.8575E−03 | 2.0210E−03 | −8.5773E−04 | 2.4208E−04 | −4.6997E−05 | 6.3522E−06 |
| S12 | 2.6243E−02 | −3.5056E−03 | −4.5945E−03 | 3.0592E−03 | −1.0799E−03 | 2.5330E−04 | −4.1714E−05 | 4.9245E−06 | −4.1906E−07 |
| S13 | −8.5356E−02 | 2.9093E−02 | −8.9042E−03 | 2.2553E−03 | −4.1229E−04 | 5.3438E−05 | −4.9864E−06 | 3.3956E−07 | −1.6942E−08 |
| S14 | −9.4262E−02 | 3.4735E−02 | −1.0822E−02 | 2.5924E−03 | −4.6382E−04 | 6.1622E−05 | −6.0777E−06 | 4.4413E−07 | −2.3874E−08 |

Figures 6A, 6B:
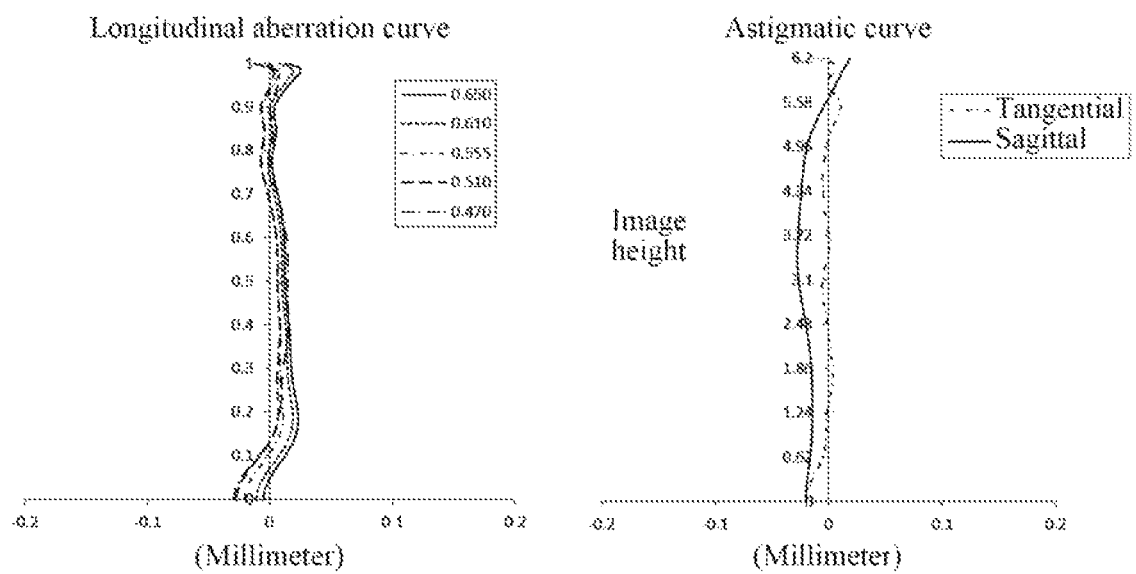
FIGS. 6A to 6D illustrate a longitudinal aberration curve, an astigmatic curve, a distortion curve and a lateral color curve of the optical imaging lens assembly according to Example 3, respectively.
Figures 6C, 6D:
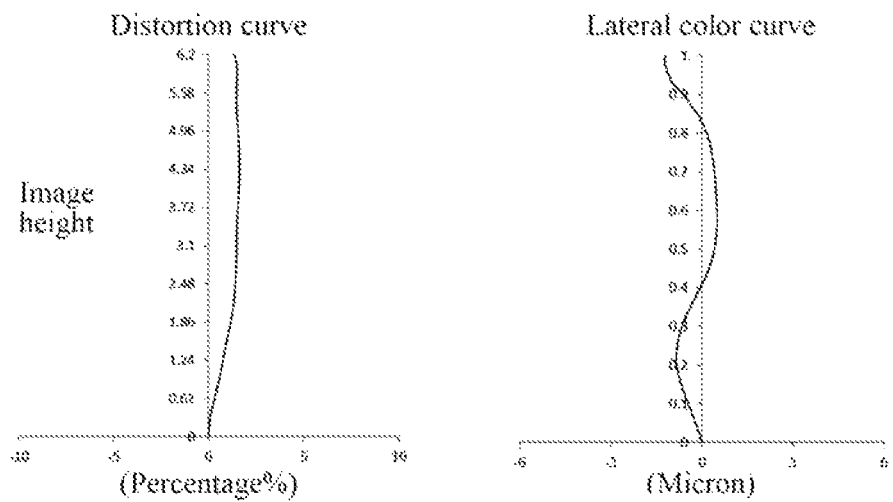

FIG. 6A illustrates the longitudinal aberration curve of the optical imaging lens assembly according to Example 3, representing deviations of focal points converged by light of different wavelengths after passing through the lens assembly. FIG. 6B illustrates the astigmatic curve of the optical imaging lens assembly according to Example 3, representing a curvature of a tangential plane and a curvature of a sagittal plane. FIG. 6C illustrates the distortion curve of the optical imaging lens assembly according to Example 3, representing the amounts of distortion corresponding to different image heights. FIG. 6D illustrates the lateral color curve of the optical imaging lens assembly according to Example 3, representing deviations of different image heights on an imaging plane after light passes through the lens assembly. It can be seen from FIG. 6A to FIG. 6D that the optical imaging lens assembly provided in Example 3 can achieve good image quality.

Example 4

Figure 7:
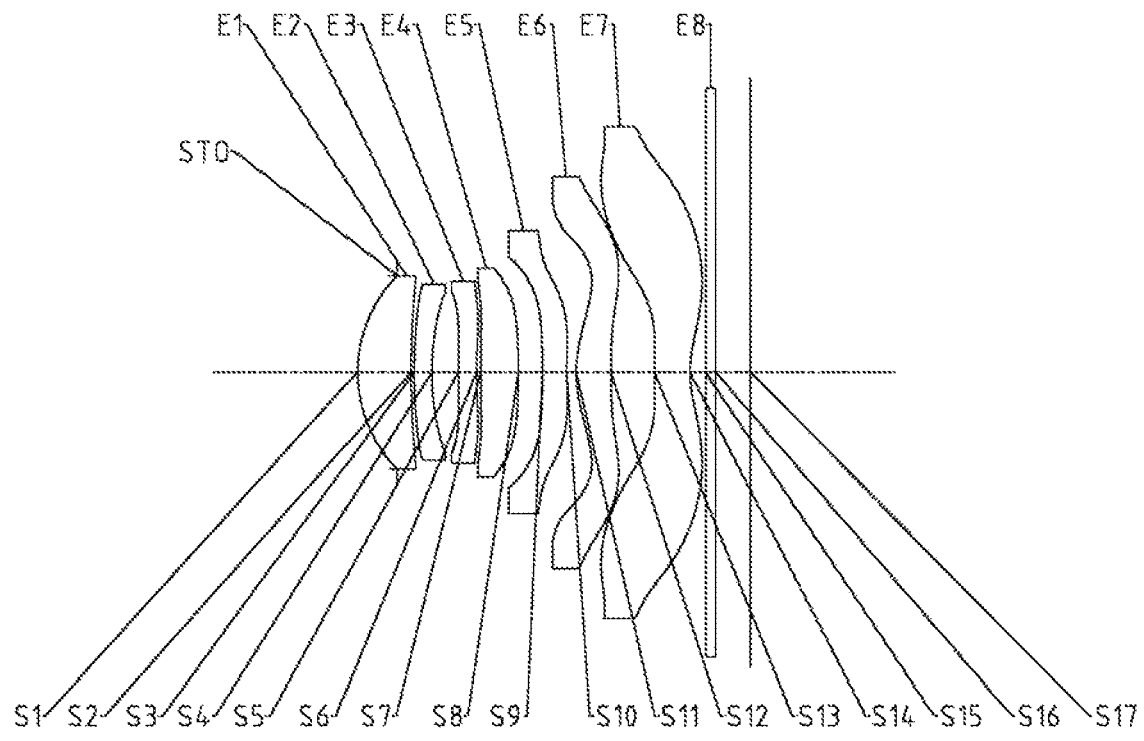
FIG. 7 illustrates a schematic structural view of an optical imaging lens assembly according to Example 4 of the present disclosure.

An optical imaging lens assembly according to Example 4 of the present disclosure is described below with reference to FIG. 7 to FIG. 8D. FIG. 7 illustrates a schematic structural view of the optical imaging lens assembly according to Example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an image plane S17, and light from an object sequentially passes through the respective surfaces S1 to S16 and is finally imaged on the image plane S17.

In Example 4, a total effective focal length f of the optical imaging lens assembly is 6.52 mm, an on-axis distance TTL along the optical axis from the object-side surface S1 of the first lens E1 to the image plane S17 is 8.21 mm, and half of a diagonal length ImgH of an effective pixel area on the image plane S17 is 6.17 mm.

Table 7 is a table illustrating basic parameters of the optical imaging lens assembly of Example 4, where the units for the radius of curvature, the thickness/distance and the focal length are millimeter (mm). Table 8 shows high-order coefficients applicable to each aspheric surface in Example 4, where the surface shape of each aspheric surface may be defined by the formula (1) given in the above Example 1.

TABLE 7

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | 2000.0000 | | | | |
| STO | Spherical | Infinite | −0.8235 | | | | |
| S1 | Aspheric | 2.9210 | 1.1137 | 1.55 | 56.1 | 6.82 | 0.0238 |
| S2 | Aspheric | 11.7263 | 0.0662 | | | | −46.0911 |
| S3 | Aspheric | 8.0530 | 0.3700 | 1.68 | 1.92 | −22.37 | −0.4977 |
| S4 | Aspheric | 5.1612 | 0.5540 | | | | −0.5181 |
| S5 | Aspheric | 19.7376 | 0.3820 | 1.68 | 1.92 | −28.71 | 2.8695 |
| S6 | Aspheric | 9.7211 | 0.0840 | | | | −80.0000 |
| S7 | Aspheric | 19.5002 | 0.7893 | 1.55 | 56.1 | 16.92 | −58.3253 |
| S8 | Aspheric | −17.3030 | 0.4994 | | | | 12.2397 |
| S9 | Aspheric | −57.5511 | 0.5118 | 1.57 | 37.3 | −13.60 | −4.2477 |
| S10 | Aspheric | 8.9983 | 0.1991 | | | | −1.6293 |
| S11 | Aspheric | 2.7473 | 0.7266 | 1.54 | 55.7 | 5.60 | −4.4638 |
| S12 | Aspheric | 28.8781 | 0.9113 | | | | 38.0668 |
| S13 | Aspheric | 12.1117 | 0.7400 | 1.54 | 55.7 | −5.29 | −32.3315 |
| S14 | Aspheric | 2.2545 | 0.3267 | | | | −1.1696 |
| S15 | Spherical | Infinite | 0.2100 | 1.52 | 64.2 | | |
| S16 | Spherical | Infinite | 0.7293 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −1.6826E−03 | 8.6413E−03 | −2.3468E−02 | 4.2882E−02 | −5.3521E−02 | 4.6996E−02 | −2.9715E−02 | 1.3729E−02 | −4.6581E−03 |
| S2 | −2.9280E−02 | 3.3252E−02 | −5.9307E−02 | 1.7292E−01 | −3.5678E−01 | 4.7847E−01 | −4.3458E−01 | 2.7549E−01 | −1.2347E−01 |
| S3 | −4.2109E−02 | 5.8429E−02 | −1.5750E−01 | 4.6175E−01 | −9.2132E−01 | 1.2351E+00 | −1.1485E+00 | 7.5636E−01 | −3.5540E−01 |
| S4 | −1.2637E−02 | −6.4278E−03 | 9.1661E−02 | −3.0885E−01 | 6.7523E−01 | −1.0337E+00 | 1.1313E+00 | −8.9246E−01 | 5.0710E−01 |
| S5 | −3.1037E−02 | 4.7841E−02 | −1.9919E−01 | 5.5334E−01 | −1.0478E+00 | 1.3935E+00 | −1.3314E+00 | 9.2413E−01 | −4.6618E−01 |
| S6 | −1.8934E−02 | 2.5668E−02 | −8.8441E−02 | 1.8376E−01 | −2.5486E−01 | 2.4502E−01 | −1.6640E−01 | 8.0404E−02 | −2.7479E−02 |
| S7 | −1.2356E−02 | 6.6201E−03 | −1.9982E−02 | 2.9690E−02 | −2.7765E−02 | 1.6970E−02 | −6.5057E−03 | 1.3821E−03 | −8.0002E−05 |
| S8 | −4.0060E−03 | −3.1455E−02 | 9.8839E−02 | −2.0037E−01 | 2.6844E−01 | −2.4954E−01 | 1.6517E−01 | −7.8800E−02 | 2.7136E−02 |
| S9 | −1.8042E−02 | −1.9589E−02 | 5.9060E−02 | −8.1819E−02 | 6.8994E−02 | −3.8298E−02 | 1.4101E−02 | −3.2955E−03 | 4.0418E−04 |
| S10 | −7.5464E−03 | 8.5474E−03 | 2.4664E−02 | −3.3950E−02 | 2.5339E−02 | −1.2485E−02 | 4.2492E−03 | −1.0159E−03 | 1.7168E−04 |
| 511 | −1.4003E−02 | 5.3346E−03 | −2.9519E−03 | −5.5745E−04 | 1.3535E−03 | −7.6114E−04 | 2.4193E−04 | −4.9683E−05 | 6.8939E−06 |
| S12 | 2.6069E−02 | 2.8239E−03 | −1.1843E−02 | 6.9964E−03 | −2.4002E−03 | 5.5348E−04 | −9.0027E−05 | 1.0542E−05 | −8.9331E−07 |
| S13 | −8.6322E−02 | 3.1393E−02 | −1.1574E−02 | 3.5016E−03 | −7.3499E−04 | 1.0685E−04 | −1.1047E−05 | 8.2759E−07 | −4.5213E−08 |
| S14 | −9.6974E−02 | 3.7939E−02 | −1.2931E−02 | 3.3541E−03 | −6.3726E−04 | 8.8488E−05 | −9.0204E−06 | 6.7622E−07 | −3.7106E−08 |

Figure 8A:
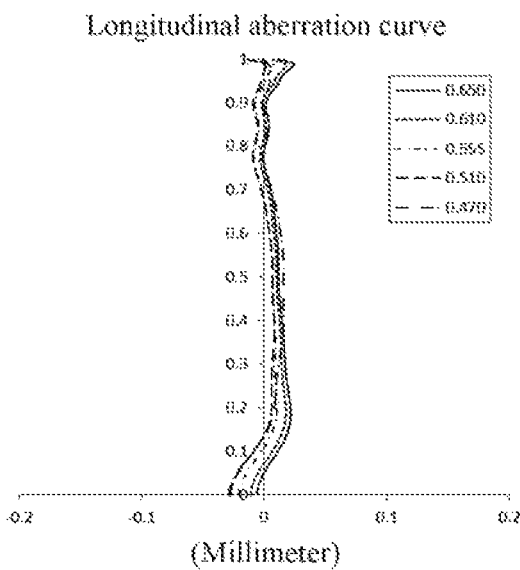
FIGS. 8A to 8D illustrate a longitudinal aberration curve, an astigmatic curve, a distortion curve and a lateral color curve of the optical imaging lens assembly according to Example 4, respectively.
Figure 8B:
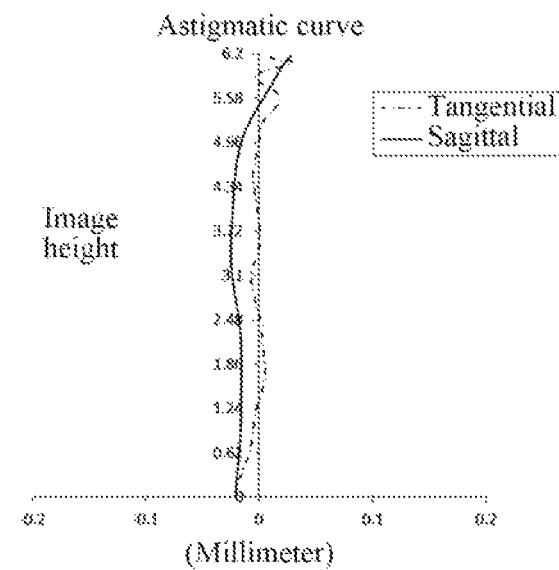
Figure 8C:
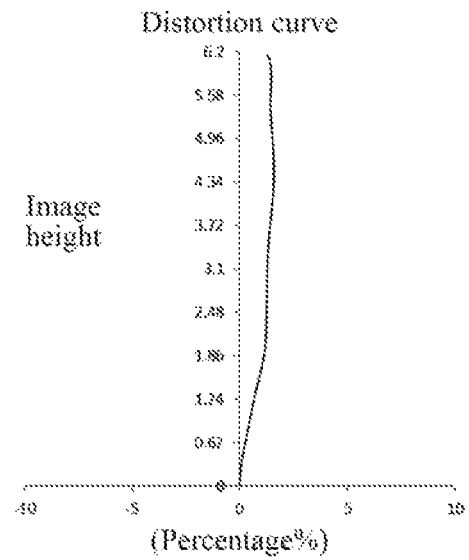
Figure 8D:
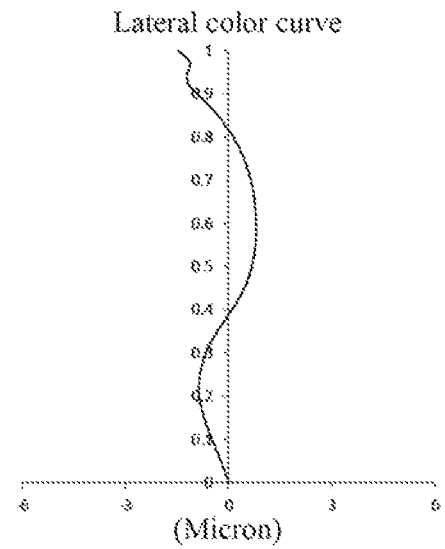

FIG. 8A illustrates the longitudinal aberration curve of the optical imaging lens assembly according to Example 4, representing deviations of focal points converged by light of different wavelengths after passing through the lens assembly. FIG. 8B illustrates the astigmatic curve of the optical imaging lens assembly according to Example 4, representing a curvature of a tangential plane and a curvature of a sagittal plane. FIG. 8C illustrates the distortion curve of the optical imaging lens assembly according to Example 4, representing the amounts of distortion corresponding to different image heights. FIG. 8D illustrates the lateral color curve of the optical imaging lens assembly according to Example 4, representing deviations of different image heights on an imaging plane after light passes through the lens assembly. It can be seen from FIG. 8A to FIG. 8D that the optical imaging lens assembly provided in Example 4 can achieve good image quality.

Example 5

Figure 9:
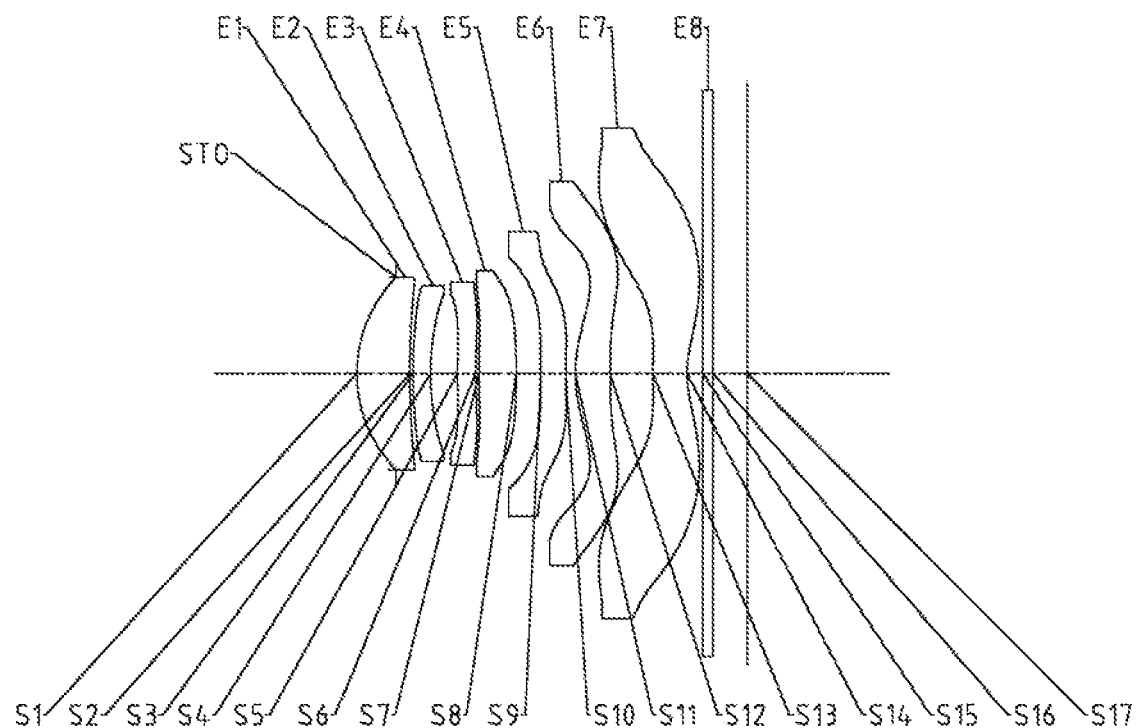
FIG. 9 illustrates a schematic structural view of an optical imaging lens assembly according to Example 5 of the present disclosure.

An optical imaging lens assembly according to Example 5 of the present disclosure is described below with reference to FIG. 9 to FIG. 10D. FIG. 9 illustrates a schematic structural view of the optical imaging lens assembly according to Example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an image plane S17, and light from an object sequentially passes through the respective surfaces S1 to S16 and is finally imaged on the image plane S17.

In Example 5, a total effective focal length f of the optical imaging lens assembly is 6.52 mm, an on-axis distance TTL along the optical axis from the object-side surface S1 of the first lens E1 to the image plane S17 is 8.20 mm, and half of a diagonal length ImgH of an effective pixel area on the image plane S17 is 6.13 mm.

Table 9 is a table illustrating basic parameters of the optical imaging lens assembly of Example 5, where the units for the radius of curvature, the thickness/distance and the focal length are millimeter (mm). Table 10 shows high-order coefficients applicable to each aspheric surface in Example 5, where the surface shape of each aspheric surface may be defined by the formula (1) given in the above Example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.8232 | | | | |
| S1 | Aspheric | 2.9249 | 1.1100 | 1.55 | 56.1 | 6.87 | 0.0219 |
| S2 | Aspheric | 11.5325 | 0.0685 | | | | −44.8573 |
| S3 | Aspheric | 7.9905 | 0.3700 | 1.68 | 1.92 | −23.21 | 0.2569 |
| S4 | Aspheric | 5.1992 | 0.5658 | | | | −0.4511 |
| S5 | Aspheric | 19.5048 | 0.3820 | 1.68 | 1.92 | −27.42 | 0.9259 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | 9.4404 | 0.0694 | | | | −1.0000 |
| S7 | Aspheric | 20.4016 | 0.7832 | 1.55 | 56.1 | 16.95 | −76.8763 |
| S8 | Aspheric | −16.7019 | 0.5147 | | | | 7.2357 |
| S9 | Aspheric | −79.1018 | 0.5247 | 1.57 | 37.3 | −14.39 | −23.8383 |
| S10 | Aspheric | 9.1831 | 0.2007 | | | | −1.0940 |
| S11 | Aspheric | 2.7954 | 0.7337 | 1.54 | 55.7 | 5.65 | −4.7423 |
| S12 | Aspheric | 32.2228 | 0.8956 | | | | 21.3708 |
| S13 | Aspheric | 11.6648 | 0.7200 | 1.54 | 55.7 | −5.32 | −42.5781 |
| S14 | Aspheric | 2.2449 | 0.3334 | | | | −1.1990 |
| S15 | Spherical | Infinite | 0.2100 | 1.52 | 64.2 | | |
| S16 | Spherical | Infinite | 0.7165 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −1.7859E−03 | 9.4858E−03 | −2.6930E−02 | 5.0947E−02 | −6.5356E−02 | 5.8590E−02 | −3.7564E−02 | 1.7476E−02 | −5.9282E−03 |
| S2 | −2.7711E−02 | 2.9030E−02 | −5.0008E−02 | 1.5573E−01 | −3.3287E−01 | 4.5417E−01 | −4.1654E−01 | 2.6568E−01 | −1.1958E−01 |
| S3 | −4.1212E−02 | 5.7736E−02 | −1.6131E−01 | 4.7347E−01 | −9.3803E−01 | 1.2479E+00 | −1.1519E+00 | 7.5331E−01 | −3.5159E−01 |
| S4 | −1.2866E−02 | −7.7350E−04 | 5.7610E−02 | −1.9046E−01 | 4.0794E−01 | −6.2242E−01 | 6.8752E−01 | −5.5131E−01 | 3.1946E−01 |
| S5 | −3.1491E−02 | 5.6674E−02 | −2.3693E−01 | 6.4182E−01 | −1.1717E+00 | 1.4938E+00 | −1.3635E+00 | 9.0255E−01 | −4.3386E−01 |
| S6 | −2.9252E−02 | 3.1580E−02 | −9.5261E−02 | 1.8224E−01 | −2.3108E−01 | 2.0229E−01 | −1.2498E−01 | 5.4989E−02 | −1.7160E−02 |
| S7 | −1.3515E−02 | 1.3696E−02 | −4.8389E−02 | 8.5671E−02 | −9.7189E−02 | 7.1059E−02 | −3.6019E−02 | 1.2384E−02 | −2.8306E−03 |
| S8 | −6.0521E−03 | −2.1552E−02 | 6.4593E−02 | −1.3155E−01 | 1.7815E−01 | −1.6804E−01 | 1.1321E−01 | −5.5100E−02 | 1.9391E−02 |
| S9 | −1.7640E−02 | −7.5865E−03 | 2.2864E−02 | −2.3975E−02 | 1.0290E−02 | 2.1828E−03 | −5.5225E−03 | 3.5102E−03 | −1.2925E−03 |
| S10 | −7.6500E−02 | 1.7976E−02 | 6.5881E−03 | −1.2273E−02 | 8.3423E−03 | −3.5224E−03 | 9.9061E−04 | −1.8487E−04 | 2.1957E−05 |
| S11 | −1.5319E−02 | 2.8077E−02 | 2.2766E−02 | −4.3473E−02 | 3.9346E−02 | −1.2103E−02 | 3.3758E−04 | −6.5626E−05 | 8.9626E−06 |
| S12 | 2.6931E−02 | −4.0197E−03 | −2.8410E−03 | 1.5385E−03 | −4.1895E−04 | 7.4630E−05 | −8.8264E−06 | 6.2989E−07 | −1.5332E−08 |
| S13 | −8.3224E−02 | 2.6811E−02 | −7.1034E−03 | 1.4596E−03 | −2.0173E−04 | 1.7192E−05 | −7.0726E−07 | −1.7259E−08 | 4.3253E−09 |
| S14 | −9.5177E−02 | 3.5187E−02 | −1.0997E−02 | 2.6493E−03 | −4.7841E−04 | 6.4300E−05 | −6.4177E−06 | 4.7407E−07 | −2.5711E−08 |

Figures 10A, 10B:
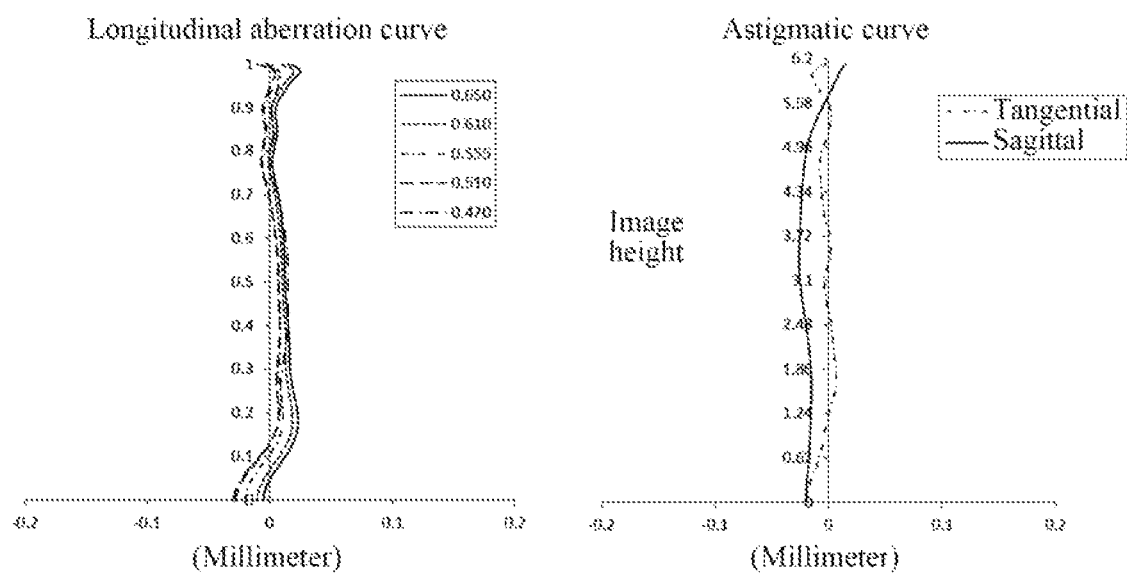

FIG. 10A illustrates the longitudinal aberration curve of the optical imaging lens assembly according to Example 5, representing deviations of focal points converged by light of different wavelengths after passing through the lens assembly. FIG. 10B illustrates the astigmatic curve of the optical imaging lens assembly according to Example 5, representing a curvature of a tangential plane and a curvature of a sagittal plane. FIG. 10C illustrates the distortion curve of the optical imaging lens assembly according to Example 5, representing the amounts of distortion corresponding to different image heights. FIG. 10D illustrates the lateral color curve of the optical imaging lens assembly according to Example 5, representing deviations of different image heights on an imaging plane after light passes through the lens assembly. It can be seen from FIG. 10A to FIG. 10D that the optical imaging lens assembly provided in Example 5 can achieve good image quality.

Example 6

An optical imaging lens assembly according to Example 6 of the present disclosure is described below with reference to FIG. 11 to FIG. 12D. FIG. 11 illustrates a schematic structural view of the optical imaging lens assembly according to Example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a concave surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. The optical imaging lens assembly has an image plane S17, and light from an object sequentially passes through the respective surfaces S1 to S16 and is finally imaged on the image plane S17.

In Example 6, a total effective focal length f of the optical imaging lens assembly is 6.52 mm, an on-axis distance TTL along the optical axis from the object-side surface S1 of the first lens E1 to the image plane S17 is 8.20 mm, and half of a diagonal length ImgH of an effective pixel area on the image plane S17 is 6.06 mm.

Table 11 is a table illustrating basic parameters of the optical imaging lens assembly of Example 6, where the units for the radius of curvature, the thickness/distance and the focal length are millimeter (mm). Table 12 shows high-order coefficients applicable to each aspheric surface in Example 6, where the surface shape of each aspheric surface may be defined by the formula (1) given in the above Example 1.

optical imaging lens assembly according to Example 6, representing deviations of different image heights on an imaging plane after light passes through the lens assembly. It can be seen from FIG. 12A to FIG. 12D that the optical imaging lens assembly provided in Example 6 can achieve good image quality.

In view of the above, examples 1 to 6 respectively satisfy the relationship shown in Table 13.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.8225 | | | | |
| S1 | Aspheric | 2.9254 | 1.1157 | 1.55 | 56.1 | 6.83 | 0.0193 |
| S2 | Aspheric | 11.7275 | 0.0722 | | | | −46.8648 |
| S3 | Aspheric | 8.0888 | 0.3700 | 1.68 | 1.92 | −23.02 | −0.4444 |
| S4 | Aspheric | 5.2285 | 0.5667 | | | | −0.5601 |
| S5 | Aspheric | 20.6383 | 0.3820 | 1.68 | 1.92 | −27.30 | 2.3833 |
| S6 | Aspheric | 9.6813 | 0.0675 | | | | −62.3124 |
| S7 | Aspheric | 21.3533 | 0.8043 | 1.55 | 56.1 | 16.89 | −70.3518 |
| S8 | Aspheric | −16.0197 | 0.4877 | | | | 9.6563 |
| S9 | Aspheric | −72.0410 | 0.5192 | 1.57 | 37.3 | −14.69 | −80.0000 |
| S10 | Aspheric | 9.5032 | 0.2093 | | | | −1.2598 |
| S11 | Aspheric | 2.7900 | 0.7163 | 1.54 | 55.7 | 5.71 | −4.6252 |
| S12 | Aspheric | 27.9796 | 0.9149 | | | | 28.2322 |
| S13 | Aspheric | 12.4427 | 0.7200 | 1.54 | 55.7 | −5.30 | −30.9213 |
| S14 | Aspheric | 2.2694 | 0.3300 | | | | −1.1800 |
| S15 | Spherical | Infinite | 0.2100 | 1.52 | 64.2 | | |
| S16 | Spherical | Infinite | 0.7131 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −1.1471E−03 | 5.5464E−03 | −1.3257E−02 | 2.1049E−02 | −2.1647E−02 | 1.4230E−02 | −5.5945E−03 | 9.2154E−04 | 2.4065E−04 |
| S2 | −2.5505E−02 | 2.7293E−02 | −5.4123E−02 | 1.6870E−01 | −3.5131E−01 | 4.7046E−01 | −4.2596E−01 | 2.6914E−01 | −1.2025E−01 |
| S3 | −3.8359E−02 | 5.3183E−02 | −1.5536E−01 | 4.6628E−01 | −9.3283E−01 | 1.2498E+00 | −1.1611E+00 | 7.6408E−01 | −3.5880E−01 |
| S4 | −1.1331E−02 | −9.3456E−03 | 1.0630E−01 | −3.6803E−01 | 8.2585E−01 | −1.2843E+00 | 1.4160E+00 | −1.1192E+00 | 6.3508E−01 |
| S5 | −3.2720E−02 | 7.0615E−02 | −3.1194E−01 | 8.8413E−01 | −1.6837E+00 | 2.2377E+00 | −2.1287E+00 | 1.4680E+00 | −7.3508E−01 |
| S6 | −2.1841E−02 | 3.6814E−02 | −1.2181E−01 | 2.3749E−01 | −3.0307E−01 | 2.6500E−01 | −1.6247E−01 | 7.0555E−02 | −2.1629E−02 |
| S7 | −1.4054E−02 | 1.9902E−02 | −6.7177E−02 | 1.1956E−01 | −1.3508E−01 | 1.0226E−01 | −5.2632E−02 | 1.8422E−02 | −4.3136E−03 |
| S8 | −5.3923E−03 | −2.2344E−02 | 6.6443E−02 | −1.3130E−01 | 1.7221E−01 | −1.5753E−01 | 1.0311E−01 | −4.8846E−02 | 1.6760E−02 |
| S9 | −2.0725E−02 | −2.8699E−03 | 1.6020E−02 | −1.7477E−02 | 6.9880E−03 | 2.4645E−03 | −4.7458E−03 | 2.9267E−03 | −1.0669E−03 |
| S10 | −7.8782E−02 | 2.2923E−02 | −2.1283E−03 | −3.3492E−03 | 2.6439E−03 | −1.0765E−03 | 2.5629E−04 | −2.8232E−05 | −1.7828E−06 |
| S11 | −1.5230E−02 | 5.0159E−03 | −2.1044E−03 | −7.1267E−04 | 1.1276E−03 | −5.9735E−04 | 1.8833E−04 | −3.9173E−05 | 5.5611E−06 |
| S12 | 2.6330E−02 | −1.4793E−02 | −6.3903E−03 | 3.7772E−03 | −1.2537E−03 | 2.8184E−04 | −4.5087E−05 | 5.2227E−06 | −4.3933E−07 |
| S13 | −8.7197E−02 | 3.0466E−02 | −9.3159E−03 | 2.2806E−03 | −3.9400E−04 | 4.7199E−05 | −3.9571E−06 | 2.3282E−07 | −9.4689E−09 |
| S14 | −9.6291E−02 | 3.6088E−02 | −1.1413E−02 | 2.7738E−03 | −5.0419E−04 | 6.8188E−05 | −6.8569E−06 | 5.1140E−07 | −2.8067E−08 |

Figure 12A:
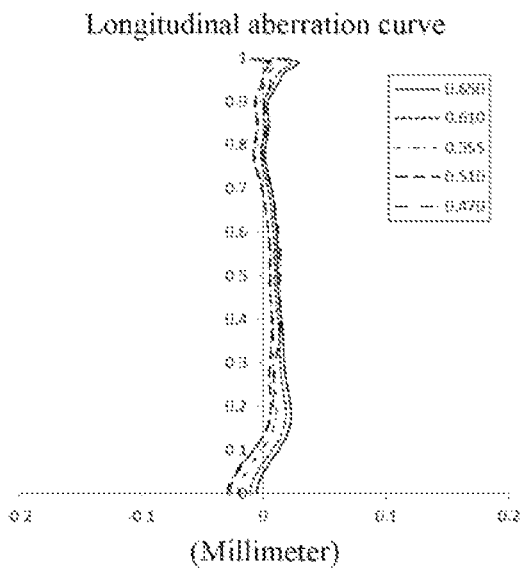
FIGS. 12A to 12D illustrate a longitudinal aberration curve, an astigmatic curve, a distortion curve and a lateral color curve of the optical imaging lens assembly according to Example 6, respectively.
Figure 12B:
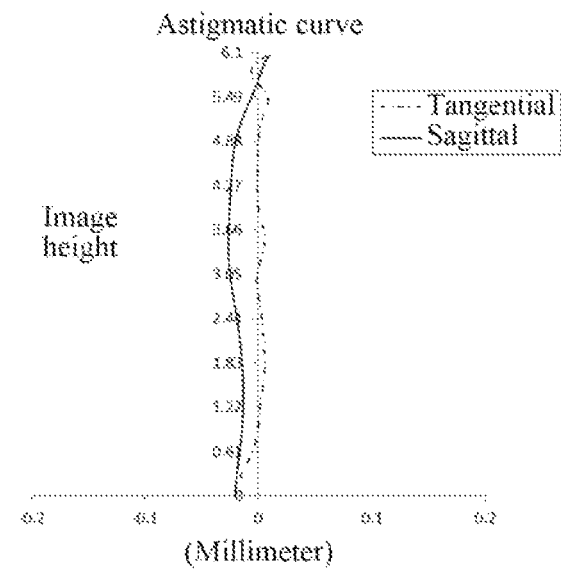
Figure 12C:
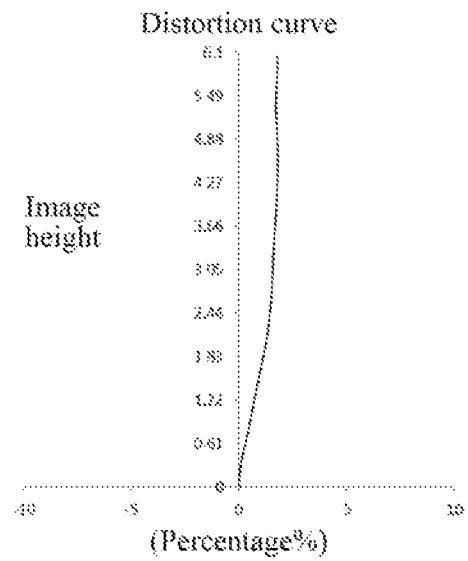
Figure 12D:
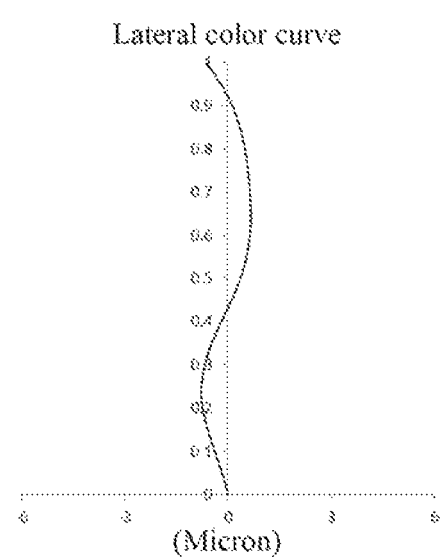

FIG. 12A illustrates the longitudinal aberration curve of the optical imaging lens assembly according to Example 6, representing deviations of focal points converged by light of different wavelengths after passing through the lens assembly. FIG. 12B illustrates the astigmatic curve of the optical imaging lens assembly according to Example 6, representing a curvature of a tangential plane and a curvature of a sagittal plane. FIG. 12C illustrates the distortion curve of the optical imaging lens assembly according to Example 6, representing the amounts of distortion corresponding to different image heights. FIG. 12D illustrates the lateral color curve of the

TABLE 13

| Conditional/Example | 1 | 2 | 3 | 4 | 5 | 6 |
|---|---|---|---|---|---|---|
| ImgH × EPD/f(mm) | 3.93 | 3.90 | 3.85 | 3.83 | 3.81 | 3.76 |
| F × tan(FOV/2)(mm) | 6.20 | 6.14 | 6.05 | 6.03 | 6.00 | 5.92 |
| f/EPD | 1.61 | 1.61 | 1.61 | 1.61 | 1.61 | 1.61 |
| FOV(°) | 87.1 | 86.6 | 85.8 | 85.5 | 85.2 | 84.5 |
| (f2 + f5)/f3 | 1.35 | 1.35 | 1.35 | 1.25 | 1.37 | 1.38 |
| f4/(f1 + f6) | 1.31 | 1.32 | 1.33 | 1.36 | 1.35 | 1.35 |
| (R14 − R13)/f7 | 1.94 | 2.13 | 2.12 | 1.86 | 1.77 | 1.92 |
| (R2 + R1)/(R2 − R1) | 1.65 | 1.66 | 1.67 | 1.66 | 1.68 | 1.66 |
| TTL/ImgH | 1.30 | 1.31 | 1.32 | 1.33 | 1.34 | 1.35 |
| f12/(CT1 + CT2) | 5.98 | 5.93 | 5.97 | 5.99 | 5.98 | 5.94 |

TABLE 13-continued

| Conditional/Example | 1 | 2 | 3 | 4 | 5 | 6 |
|---|---|---|---|---|---|---|
| CT4/ET4 | 2.31 | 2.35 | 2.33 | 2.29 | 2.27 | 2.33 |
| SAG71/SAG61 | 1.92 | 1.94 | 2.01 | 2.10 | 1.98 | 1.95 |
| (CT6 + CT7)/T67 | 1.56 | 1.55 | 1.57 | 1.61 | 1.62 | 1.57 |

The present disclosure further provides an imaging apparatus, having an electronic photosensitive element for imaging, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, from an object side to an image side along an optical axis sequentially comprising:
    a first lens having positive refractive power;
    a second lens;
    a third lens;
    a fourth lens;
    a fifth lens, an image-side surface of the fifth lens being a concave surface;
    a sixth lens having positive refractive power; and
    a seventh lens having negative refractive power, an object-side surface of the seventh lens being a convex surface, and an image-side surface of the seventh lens being a concave surface;
    wherein, half of a diagonal length ImgH of an effective pixel area on an image plane, an entrance pupil diameter EPD of the optical lens assembly, and a total effective focal length f of the optical imaging lens assembly satisfy:

ImgH*EPD/$f$>3.5 mm; and a radius of curvature R14 of the image-side surface of the seventh lens, a radius of curvature R13 of the object-side surface of the seventh lens, and an effective focal length f7 of the seventh lens satisfy:

1.7<(R14−R13)/$f7$<2.2.

2. The optical imaging lens assembly according to claim 1, wherein the total effective focal length f of the optical imaging lens assembly and a maximal field-of-view FOV of the optical imaging lens assembly satisfy:

5.5 mm<$f$*tan(FOV/2)<6.5 mm.

3. The optical imaging lens assembly according to claim 1, wherein the total effective focal length f of the optical imaging lens assembly and the entrance pupil diameter EPD of the optical imaging lens assembly satisfy:

$f$/EPD<1.7.

4. The optical imaging lens assembly according to claim 1, wherein a maximal field-of-view FOV of the optical imaging lens assembly satisfies:

80°<FOV<100°.

5. The optical imaging lens assembly according to claim 1, wherein an effective focal length f2 of the second lens, an effective focal length f5 of the fifth lens, and an effective focal length f3 of the third lens satisfy:

1.0<($f2$+$f5$)/$f3$<1.5.

6. The optical imaging lens assembly according to claim 1, wherein an effective focal length f4 of the fourth lens, an effective focal length f1 of the first lens, and an effective focal length f6 of the sixth lens satisfy:

1.2<$f4$/($f1$+$f6$)<1.6.

7. The optical imaging lens assembly according to claim 1, wherein a radius of curvature R2 of an image-side surface of the first lens and a radius of curvature R1 of an object-side surface of the first lens satisfy:

1.5<(R2+R1)/(R2−R1)<2.0.

8. The optical imaging lens assembly according to claim 1, wherein an axial distance TTL from the object-side surface of the first lens to the image plane and the half of the diagonal length ImgH of the effective pixel area on the image plane satisfy:

TTL/ImgH<1.4.

9. The optical imaging lens assembly according to claim 1, wherein a combined focal length f12 of the first lens and the second lens, a central thickness CT1 of the first lens on the optical axis, and a central thickness CT2 of the second lens on the optical axis satisfy:

5.5<$f12$/(CT1+CT2)<6.5.

10. The optical imaging lens assembly according to claim 1, wherein a center thickness CT4 of the fourth lens on the optical axis and an edge thickness ET4 of the fourth lens may satisfy:

2.0<CT4/ET4<2.5.

11. The optical imaging lens assembly according to claim 1, wherein an on-axis distance SAG71 from an intersection of the object-side surface of the seventh lens and the optical axis to a vertex of an effective radius of the object-side surface of the seventh lens and an on-axis distance SAG61 from an intersection of an object-side surface of the sixth lens and the optical axis to a vertex of an effective radius of the object-side surface of the sixth lens may satisfy:

1.8<SAG71/SAG61<2.3.

12. The optical imaging lens assembly according to claim 1, wherein a center thickness CT6 of the sixth lens on the optical axis, a center thickness CT7 of the seventh lens on the optical axis, and a spacing distance T67 between the sixth lens and the seventh lens on the optical axis satisfy:

1.4<(CT6+CT7)/T67<1.8.

13. An optical imaging lens assembly, from an object side to an image side along an optical axis sequentially comprising:
    a first lens having positive refractive power;
    a second lens;
    a third lens;
    a fourth lens;

a fifth lens, an image-side surface of the fifth lens being a concave surface;

a sixth lens having positive refractive power; and a seventh lens having negative refractive power, an object-side surface of the seventh lens being a convex surface, and an image-side surface of the seventh lens being a concave surface;

wherein, a radius of curvature R14 of the image-side surface of the seventh lens, a radius of curvature R13 of the object-side surface of the seventh lens, and an effective focal length f7 of the seventh lens satisfy:

$1.7<(R14-R13)/f7<2.2$; and an effective focal length f4 of the fourth lens, an effective focal length f1 of the first lens, and an effective focal length f6 of the sixth lens satisfy:

$1.2 \leq f4/(f1+f6)<1.6$.

14. The optical imaging lens assembly according to claim 13, wherein the total effective focal length f of the optical imaging lens assembly and a maximal field-of-view FOV of the optical imaging lens assembly satisfy:

$5.5 \text{ mm} \leq f*\tan(FOV/2)<6.5 \text{ mm}$.

15. The optical imaging lens assembly according to claim 13, wherein the total effective focal length f of the optical imaging lens assembly and the entrance pupil diameter EPD of the optical imaging lens assembly satisfy:

$f/EPD<1.7$.

16. The optical imaging lens assembly according to claim 13, wherein a maximal field-of-view FOV of the optical imaging lens assembly satisfies:

$80°<FOV<100°$.

17. The optical imaging lens assembly according to claim 13, wherein an effective focal length f2 of the second lens, an effective focal length f5 of the fifth lens, and an effective focal length f3 of the third lens satisfy:

$1.0<(f2+f5)/f3<1.5$.

18. The optical imaging lens assembly according to claim 13, wherein a radius of curvature R2 of an image-side surface of the first lens and a radius of curvature R1 of an object-side surface of the first lens satisfy: $1.5<(R2+R1)/(R2-R1)<2.0$.

* * * * *